United States Patent
Hartmann et al.

(10) Patent No.: US 6,903,653 B2
(45) Date of Patent: Jun. 7, 2005

(54) PROCESS AND SYSTEM FOR DETERMINING THE ONSET OF TREAD RUBBER SEPARATIONS OF A PNEUMATIC TIRE ON A VEHICLE

(75) Inventors: Bernd Hartmann, Bad Nenndorf (DE); Andreas Köbe, Bensheim (DE)

(73) Assignee: Continental Aktiengesellschaft, Hannover (DE)

( * ) Notice: Subject to any disclaimer, the term of this patent is extended or adjusted under 35 U.S.C. 154(b) by 96 days.

(21) Appl. No.: 10/267,672

(22) Filed: Oct. 10, 2002

(65) Prior Publication Data

US 2003/0080857 A1 May 1, 2003

(30) Foreign Application Priority Data

Oct. 30, 2001 (DE) .......................................... 101 53 072

(51) Int. Cl.[7] .............................................. B60C 23/00
(52) U.S. Cl. .......................... 340/444; 340/940; 73/146
(58) Field of Search ................................ 340/444, 443, 340/445, 438, 940; 73/146, 146.2

(56) References Cited

U.S. PATENT DOCUMENTS

| | | |
|---|---|---|
| 6,028,508 A | 2/2000 | Mason |
| 6,591,668 B1 * | 7/2003 | Becherer et al. .............. 73/146 |
| 2003/0006890 A1 * | 1/2003 | Magiawala et al. .......... 340/438 |
| 2003/0010107 A1 * | 1/2003 | Giustino et al. ............... 73/146 |
| 2004/0015312 A1 * | 1/2004 | Asano et al. ................ 702/113 |

FOREIGN PATENT DOCUMENTS

| | | |
|---|---|---|
| DE | 19908701 | 9/2000 |
| EP | 0630769 | 12/1994 |
| EP | 0786362 | 7/1997 |
| EP | 0787606 | 8/1997 |
| EP | 0826525 | 3/1998 |

* cited by examiner

Primary Examiner—Jeffery Hofsass
Assistant Examiner—Eric Blount
(74) Attorney, Agent, or Firm—Greenblum & Bernstein, P.L.C.

(57) ABSTRACT

System and method of detecting an onset of tread rubber separation of a pneumatic tire on a vehicle, in which a permanent first periodic vibration is produced, in at least one of each axle and each wheel, that is proportional to a wheel rotational speed as a speed output signal. The speed output signal is fed to a signal processing device, wherein in the onset of tread rubber separation, there is provided the superimposition on a first vibration or the speed output signal, at least one separately defined periodic vibration characteristic of the onset of tread rubber separation and proportional to the wheel rotational speed. The superimposition of the first periodic vibration with the at least one separately defined periodic vibration characteristic of the onset of tread rubber separation is detected in the signal processing device and a warning signal is produced.

38 Claims, 15 Drawing Sheets

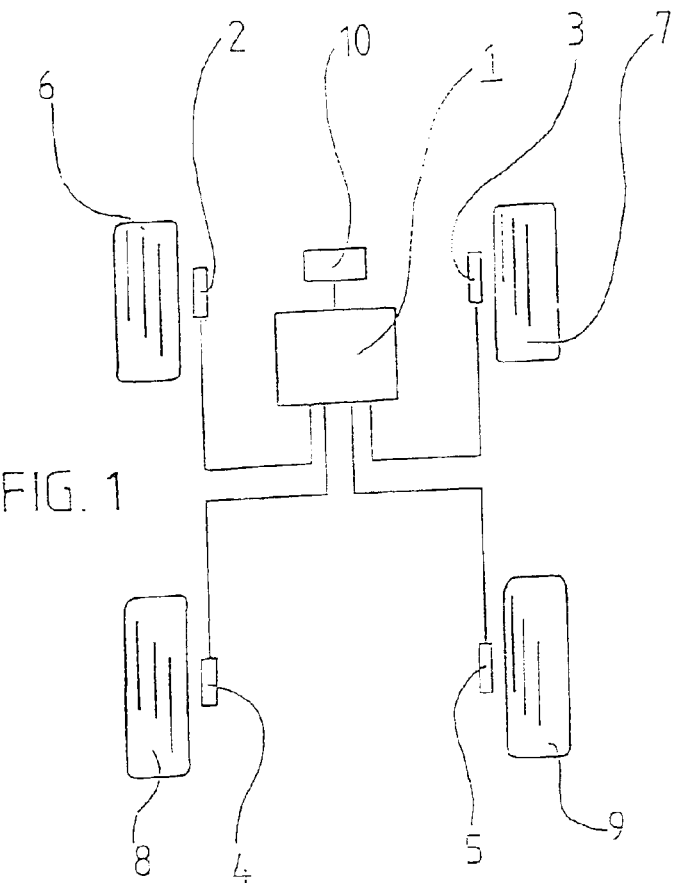
FIG. 1
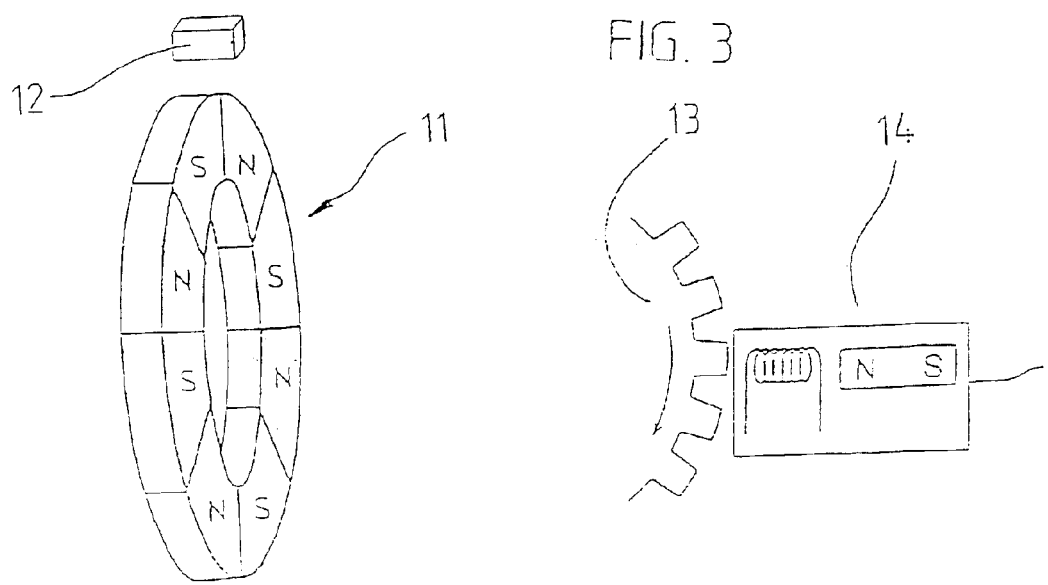
FIG. 2
FIG. 3

PROCESS AND SYSTEM FOR DETERMINING THE ONSET OF TREAD RUBBER SEPARATIONS OF A PNEUMATIC TIRE ON A VEHICLE

CROSS-REFERENCE TO RELATED APPLICATIONS

The present application claims priority under 35 U.S.C. §119 of German Patent Application No. 101 53 072.2-52, filed on Oct. 30, 2001, the disclosure of which is expressly incorporated by reference herein in its entirety.

BACKGROUND OF THE INVENTION

1. Field of the Invention

The invention relates to a process for determining the onset of tread rubber separations of a tire on a vehicle.

2. Discussion of Background Information

Ever-increasing demands on the safety of motor vehicles increasingly require a detection of all the parameters influencing and representing the driving and moving condition of a motor vehicle to be as comprehensive as possible for use in intelligent systems for chassis and vehicle control and adjustment. In particular typical dangerous situations, such as those which can occur during the sudden separation of the tread rubber or parts thereof, the danger needs to be reliably identified and appropriate warning or control signals need to be triggered.

The greatest dangers of sudden tire damage are caused by tread separations, since in most cases—particularly when driving at high speeds—the tire bursts within fractions of a second after the tread rubber separations, leading to loss of control of the vehicle and to serious accidents.

In the past, detecting and displaying the onset of tread rubber separations, a moment in which the vehicle can still be brought to a controlled stop, has been a problem in metrological terms, since these conditions are hard to detect. We have hitherto managed by using the display of other parameters which indicate a critical condition of the pneumatic tire, to also detect the onset or occurrence of tread rubber separations.

Since it is known that if internal tire pressure is too low, this will or can lead to critical damage to the pneumatic tire, a number of solutions have already been proposed in which the air pressure in the tire is registered and displayed to the driver when pressure falls below a preset desired value, causing him to stop the vehicle. Such suggestions are known from, e.g., EP 630 769 A1, EP 826 525 A2, EP 787 606 A2 and EP 786 362 A2. Finally, a system for detecting a so-called emergency operation situation is known from DE 199 08 701 A1. This system requires a tire with emergency support bodies, whereby the support body features imbalances that produce frequencies by contact with the inside of the tire in an unpressurized state, which frequencies can be detected as signals of disturbance by a sensor, in particular by a conventional ABS system.

Such solutions utilize the correlation that in many cases exists between insufficient air pressure and the resulting damage to the tire structure, in particular to the tread rubber. However, insufficient air pressure is only one cause of the dangerous tread rubber separations. They can also occur quite irrespective of the internal tire pressure, e.g., by exceeding the maximum allowable speed for the type of tire. If, for example, a snow tire restricted to 160 km/hr is driven at 180 km/hr for approximately 20 minutes, this can lead to tread rubber separations due to overheating, despite the correct air pressure. Other causes that are regularly attributable to driver error can also lead to tread rubber separations despite maintaining the correct air pressure, such as tires that are too old, too worn, or the like. Retreaded tires can also be problematic.

U.S. Pat. No. 6,028,508 B1 deals with the problem of the onset of tread rubber separations. Here a sensor in the form of a laser is proposed, which sensor is aligned with the tread rubber of a tire. Curvatures or blisters that occur on the tread rubber are detected by the laser by a change in the distance between the tread rubber and the laser. However, such an arrangement is relatively complicated and expensive, since a laser source has to be assigned to each wheel, e.g., inside the wheel case. Accumulations of dirt and foreign bodies between the tread bars can also lead to misinterpretations.

SUMMARY OF THE INVENTION

The invention therefore provides a process for detecting the onset of tread rubber separations of a pneumatic tire on a vehicle. The process permits a reliable detection of this defect in all driving conditions. The invention tolerates all occurring disturbance and influence factors, and can be used equally with all tire and vehicle sizes and with all tire constructions. Thus, it is possible to register measured values reliably and in the simplest way, without great expenditure in terms of construction or measurement equipment. Finally, the system is also economical and available for mass production.

The invention is attained through the features which will be described herein. According to one feature of the invention, one or more separately defined periodic vibrations characteristic of the onset of tread rubber separations and proportional to the wheel rotational speed are superimposed on the first vibration or the rotational speed output signal. The signal processing device detects a superposition of the first periodic vibration with the separately defined periodic vibration(s) characteristic of the onset of tread rubber separations and processes it into a warning signal.

Through the superposition of the first proportional vibration by one or more separately defined periodic vibrations characteristic of the onset of tread rubber separations and proportional to the wheel rotational speed, a specific characteristic exclusive to the onset of tread rubber separations is obtained which provides a clearly recognizable signal, regardless of influence factors, such as speed, wheel load, tire wear, road surface, etc. When such a signal occurs, it is a definite indication of the occurrence of the onset of tread rubber separations, without any further tests of the driving condition being necessary. In many cases the superposition of the rotational speed output signal with only one second periodic vibration characteristic of the onset of tread rubber separations and proportional to the wheel rotational speed is already sufficient for reliable detection.

The rotational speed output signal is advantageously provided here in the form of a permanent first periodic vibration proportional to the wheel rotational speed by active or passive magnetic field sensors, whereby magnetically active or passive devices, preferably encoders, rotating relative to the latter, and rotating with the wheel or located on stationary parts of the vehicle, produce a periodic change in the magnetic field proportional to the wheel rotational speed.

Such an embodiment of the process makes it possible to use simple and already available and tested transducers and signal generators, so that the equipment expense is reduced and a cost-effective production of the corresponding components is possible.

In an advantageous embodiment, the separately defined periodic vibrations characteristic of the onset of tread rubber separations and proportional to the wheel rotational speed of the wheel are produced.

In a further advantageous embodiment of the process, after processing in the signal processing device, the rotational speed output signal is compared to one or more reference or threshold values and with this comparison the superposition with the separate periodic vibrations characteristic of the onset of tread rubber separations is detected when the reference and/or threshold values have been exceeded and processed into a warning signal.

Such a comparison with reference and/or threshold values which is known per se increases the reliability of the detection of signals produced by the onset of tread rubber separations and opens up the possibility of further eliminating the influence of disturbance factors.

It is thus advantageous, after processing in the signal processing device, for the rotational speed output signal of a wheel or an axle to be compared to rotational speed output signals of the other wheels or axles as reference values. This leads on the one hand to a localization of the onset of tread rubber separations and furthermore rules out the possibility of disturbance factors that act on all the wheels at the same time, in particular when occurring briefly, not leading to a warning signal being triggered. The comparison can be made with wheels of one vehicle side, one vehicle axle or in the form of a comparison with diagonally opposite wheels.

In a further advantageous embodiment, the wheel speed for preset time intervals is calculated in the signal processing device from the rotational speed output signal and compared to one or more reference wheel speeds and/or threshold values, whereby in the signal processing device, on the basis of the vibration representing the rotational speed output signal, the following are provided for: (a) firstly, for several consecutive and defined wheel rotational angles the corresponding times for the partial rotations of the wheel determined by the defined wheel rotational angles are determined and stored, and subsequently, (b) within defined counting intervals $T_L$ containing several consecutive wheel rotational angles a mean wheel rotational speed for one or more wheel rotations within the counting intervals is calculated from the times determined for the partial rotations and their number and stored, after which (c) the averaged wheel speeds or their progression are compared to reference and/or threshold values, whereby (d) a warning signal is emitted if the reference and/or threshold values are exceeded.

The basis for determining or processing the corresponding times for the partial rotations of the wheel, determined by the defined wheel rotational angle, here is a "time window," i.e. a defined counting interval or measuring interval $T_L$, also called "loop time."

Such a calculation of the wheel speed entails only a relatively simple processing of the rotational speed output signal and thus reduces the outlay for electronic processing devices or computer capacity and thus the cost of the relevant electronics. However, with such a processing method of the rotational speed output signal it should be taken into account that when evaluating the number of individual pulses received within a defined counting interval $T_L$, body or structure vibrations or resonances influence and change the evaluation result, without necessarily essentially weakening its validity, so that one must weigh up the respective advantages of the simplest possible evaluation and the most precise possible evaluation result.

By the superposition of the rotational speed output signal with one or more separately defined vibrations characteristic of the onset of tread rubber separations, as provided in the process according to the invention, it is possible to conduct such a simplified observation and evaluation concentrated on the absolute value of the recorded speed, without any other signals representing the driving condition, e.g., instant longitudinal or cross acceleration values and speeds, having to be recorded. Their detection by way of corresponding transducers requires a considerable outlay in terms of equipment and their electronic processing leads to a much more complicated structure in the electronics, which can thus be dispensed with.

In such a procedure the superimposed separate additional vibrations characteristic of the onset of tread rubber separations appear as speed vibrations, i.e., as periodic speed changes within one revolution of the wheel, which are produced by the onset of tread rubber separations in differentially small time intervals of changed rolling radius. These vibrations thereby bring about a clearly noticeable change in the number of counting pulses calculated from the binary signal within the counting interval $T_L$ (loop time).

In a further advantageous embodiment of the process, in the signal processing device, on the basis of the vibration representing the rotational speed output signal, the following are provided for: (a) firstly for several consecutive and defined wheel rotational angles the corresponding times for the partial rotations of the wheel determined by the defined wheel rotational angles are determined and stored, and subsequently, (b) a mean value is calculated from several such consecutively determined times for one or more wheel revolutions and stored, after which, (c) the deviations of the times determined and stored according to (a) from the mean value calculated according to (b) are determined and then, (d) the determined deviations are compared to reference and/or threshold values, whereby, (e) a warning signal is emitted if the reference and/or threshold values are exceeded.

In this case the basis for determining or processing the corresponding times for the partial rotations of the wheel determined by the defined wheel rotational angle is not a "time window," but the partial rotation of the wheel as such, i.e., the observation of a defined wheel rotational angle or an "angle window."

With the usual sensor devices that contain cogged magnet wheels or similar elements as encoders, a conversion of the rotational speed output signal to a signal of individual pulses or a rectangular signal first ensues as a rule. This occurs in such a way that the sides of the rectangular signal are correlated with those of the transmission signals, representing the rotational speed output signal, of the magnetic field sensors, which are produced by the individual cogs of a cogged magnet wheel, such that a rectangular wave pulse of the rectangular signal represents, e.g., a wheel rotational angle defined by the passage of a cog of the magnet wheel.

With the timers that are commonly used for measuring short time intervals, and that usually require digital input signals for processing, the measurement of the times for the partial rotations of the wheel determined by the defined wheel rotational angle can be made through determining the side distances, i.e., the time differences between the sides of the rectangular signal. With such an evaluation of a rectangular wave pulse it is logical to consider the side distance or the time difference between the zero passages of the sides of the rectangular signal, thus always at a representative and identical point on the signal.

Of course, instead of a rectangular wave pulse, any other suitably conditioned vibration can also be used to determine the corresponding times for partial rotations of the wheel.

The times for partial rotations of the wheel are thus directly measured here by the time differences between the zero passages (zero passage times), i.e., the intervals $\Delta T_{0(1)}$ (t) between the sides of a rectangular wave pulse, whereby $\Delta T_0$ represents the zero passage time respectively for the findings/measurements i, i+1, i+2, etc.

With regard to taking the mean according to feature (b), in addition to averaging several consecutively determined or calculated values of a wheel revolution, a particularly suitable method of evaluation is first subjecting the individual determined times for the partial revolutions of the wheel determined by the defined wheel rotational angle before further processing to a rotationally synchronous averaging such that a mean value for several wheel revolutions is obtained over several wheel revolutions from the times measured in reference to one wheel revolution in the same time intervals or in the same rotational angle intervals. This mean value then forms the basis for further signal processing.

With such a rotationally synchronous averaging, the signals recorded on the wheel and already available after processing as "time values," (which signals are recorded with reference to a wheel revolution in the same time intervals or in the same rotational angle intervals, i.e., the signals that are produced, e.g., by the same cogs of a magnet wheel or encoder in the course of a single wheel revolution) are averaged over several wheel revolutions. Through this, the influence of signal noises or of briefly interfering disturbance factors, such as unevennesses in the road surface, etc., can be further reduced and the informative value of the signal can be amplified. This is because the then conspicuous times for the partial rotations with a separately defined vibration of the wheel characteristic of the onset of tread rubber separations are clearly distinguishable from the influences on the times produced as a rule by other disturbance factors.

Such an averaging method is also suitable both for the already mentioned evaluation on the basis of the defined counting intervals (loop time), as well as for other values resulting from a processing of the rotational speed output signal, e.g., for the frequencies, the wheel speeds, etc., as described below.

Altogether, this embodiment of the process on the one hand renders possible an extremely precise evaluation result that is almost completely uninfluenced by structure and body vibrations, and on the other hand, the determination of the times for the partial rotations of the wheel determined by the defined wheel rotational angle, or the determination of the zero passage times, provides an input or intermediate variable. Through further simple computer steps, with knowledge of the geometric relationships in the wheel or tire, these can be further processed into information on the instant wheel speed or the wheel acceleration or subjected to a pattern recognition or a frequency evaluation, as described below.

Another advantageous embodiment of the process is provided for frequency evaluation, wherein the signal processing device, on the basis of the vibration representing the rotational speed output signal, has the following characteristics: (a) firstly for several consecutive and defined wheel rotational angles the corresponding times for the partial rotations of the wheel determined by the defined wheel rotational angles are determined and stored, and subsequently, (b) the frequencies of the times determined and stored according to (a) are calculated with the aid of one or more ALUs (arithmetic logic units) by generating reciprocal values and then stored, whereby subsequently, (c) a mean value of the frequencies determined according to (b) is calculated for one or more wheel revolutions and stored, after which, (d) the deviations of the frequencies determined and stored according to (b) from the mean value calculated according to (c) are determined, and then, (e) the determined deviations are compared with reference and/or threshold values, whereby, (f) a warning signal is emitted if the reference and/or threshold values are exceeded.

A calculation of the frequencies is thus made by generating reciprocal values, e.g., according to the formula $f_{(i)}$ (t)=$0.5/\Delta T_{0(1)}$ (t), whereby f represents the determined frequency and $\Delta T_{0(1)}$ (t) represents the zero passage time respectively for the findings/measurements i, i+1, i+2, etc. In this case, the factor 0.5 results from the 2 each measured zero passage times during a vibration period of the sinusoidal rotational speed output signal of a wheel.

Here, too, according to feature (c), in addition to the averaging of several consecutively determined or calculated values of a wheel revolution, a rotationally synchronous averaging is provided, with which the signals recorded on the wheel and already available as "frequency values" after processing. These signals are recorded with reference to a wheel revolution in identical rotational angle intervals, and are averaged over several wheel revolutions. Through this, as has already been shown, the influence of signal noises or of briefly interfering disturbance factors, such as road unevennesses, etc., can be further reduced and the informative value of the signal amplified. The then conspicuous frequency of the separately defined vibration characteristic of the onset of tread rubber separations, e.g., embodied as a harmonious vibration of the $n^{th}$ order of the tire period, is clearly distinguishable from the influences produced as a rule by other disturbance factors.

In an alternative advantageous embodiment of the process with regard to the evaluation of frequencies, in the signal processing device, on the basis of the vibration representing the rotational speed output signal, the following is provided for: (a) firstly for several consecutive and defined wheel rotational angles the corresponding times for the partial rotations of the wheel determined by the defined wheel rotational angles are determined and stored, and subsequently, (b) with the aid of one or more ALUs the frequency spectrum of the times determined and stored according to (a) is subjected to a frequency analysis for determining the power spectral density, whereby subsequently, (c) with the aid of one or more ALUs the determined power spectral densities are subjected to an integration over certain selected frequency intervals and then stored, after which, (d) the integral value of the selected frequency intervals is compared to a reference or threshold value, and (e) a warning signal is emitted if the reference or threshold values are exceeded.

Such a frequency analysis can be conducted, e.g., in the form of a Fourier analysis, which can occur both through an ALU as well as, analogously, through a switching arrangement.

Such evaluations or methods can each be carried out alone or in addition to the evaluation of the standard deviations of the zero passage times. The evaluations of the frequency analysis and the subsequent integration through selected frequency intervals have the advantage that the information reliability can thus be further increased. This is because the then noticeable order of the frequency of the separately defined vibration characteristic of the onset of tread rubber separations, e.g., embodied as a harmonious vibration of the $n^{th}$ order of the tire period. Thus, they can be determined in a simple way and it is even more clearly distinguishable from influences produced as a rule by other disturbance factors.

In a further development of the invention, it can be provided that for selected frequency intervals, precisely those are used that correspond to a multiple of the wheel rotational frequency, whereby preferably low multiples of the wheel rotational frequency (n=1, 2, 3) are considered.

In another advantageous further development of the process which clarifies the evaluation result in this way, in the signal processing device, on the basis of the vibration representing the rotational speed output signal, the invention provides for the following: (a) firstly for several consecutive and defined wheel rotational angles the corresponding times for the partial rotations of the wheel determined by the defined wheel rotational angles are determined and stored, and subsequently, (b) with the aid of one or more ALUs the instant wheel speeds are calculated from the times determined and stored according to (a), and then stored, whereby subsequently, (c) a mean value of the wheel speeds determined according to (b) for one or more wheel revolutions is calculated and stored, after which, (d) the deviations of the wheel speeds determined and stored according to (b) from the mean value calculated according to (c) are determined, and then, (e) the determined deviations are compared to reference and/or threshold values, whereby, (f) a warning signal is emitted if the reference and/or threshold values are exceeded.

A calculation of the wheel speeds is hereby made, e.g., according to the formula $v_{(i)}(t)=0.02 \text{ m}/\Delta T_{0(i)}(t)$, whereby "v" represents the wheel speed and $\Delta T_0$ represents the zero passage time respectively for the findings/measurements i, i+1, i+2, etc. The rolling circumference of the wheel/tire during the zero passage time in this case is 0.02 m. Such an evaluation of the wheel speeds differs with regard to the determination process from that already mentioned and to the evaluation of the times for the partial rotations of the wheel within a loop time, since here the determination or the processing of the corresponding times for the partial rotations determined by the defined wheel rotational angle is based on the partial rotation of the wheel as such, i.e., the consideration of a defined wheel rotational angle.

In another advantageous embodiment of the process, the evaluation result can likewise be clarified by the fact that, in the signal processing device, on the basis of the vibration representing the rotational speed output signal, the invention provides for the following characteristics: (a) firstly for several consecutive and defined wheel rotational angles the corresponding times are determined and stored for the partial rotations of the wheel defined by the wheel rotational angles, and subsequently, (b) with the aid of one or more ALUs the instant wheel accelerations are calculated from the times determined and stored according to (a), and then stored, whereby subsequently, (c) a mean value of the wheel accelerations calculated according to (b) is calculated and stored for one or more wheel revolutions, after which, (d) the deviations of the wheel accelerations calculated according to (b) from the mean value calculated according to (c) or from a zero value are determined, and then, (e) the determined deviations are compared to reference and/or threshold values, whereby, (f) a warning signal is emitted if the reference and/or threshold values are exceeded.

A calculation of the wheel accelerations is hereby made, e.g., according to the formula $a_{(i)}(t)=[v_{(i)}-v_{(i-1)}]/\Delta T_{0(i)}(t)$, whereby "a" represents the wheel acceleration, "v" represents the wheel speed, and $\Delta T_0$ represents the zero passage time respectively for the findings/measurements i-1, i+1, i+2, etc.

Both embodiments of the process, namely that of the speed analysis and that of the acceleration analysis, can be carried out alone or in addition to the evaluation of the standard deviations of the zero passage times or the frequencies/frequency analysis, whereby each further or additional evaluation based on the input or intermediate variable "zero passage times" has advantages with regard to an increased reliability of information. For instance, due to the different evaluation processes, when the wheels roll on a very uneven, possibly strongly grooved foundation or a foundation with ground undulations or depressions, the rotational speed output signals can be scrutinized on the basis of several threshold values, according to which the occurrence of a vibration characteristic of the onset of tread rubber separations can be distinguished with a high degree of certainty from any other disturbance factors.

Otherwise, in the use of sensor devices that contain cogged magnet wheels or similar elements as encoders, all evaluation processes can also be embodied in addition such that misinterpretations of the signal, e.g., through possibly existing dividing errors of the toothing or also other tolerances in the mechanical elements or in the electronic components, can be avoided by the processing of the signals containing a "learning" and a self-calibration of the overall system. This can occur, e.g., by regularly occurring deviations being recognized and their signal component extracted from the determined base signal in normal condition, i.e., moving without the initial stages of tread rubber separations.

A process for determining the onset of tread rubber separations of a pneumatic tire for vehicle wheels can be used with particular advantage in a checking system for vehicle wheels with pneumatic tires, in particular in an anti-block system (ABS), whereby through the checking system at least on each axle, preferably on each wheel, a permanent first periodic vibration proportional to the wheel speed is produced and fed to a signal processing device of the checking system as a rotational speed output signal, whereby a separately defined second periodic vibration characteristic of the onset of tread rubber separations and proportional to the wheel rotational speed is superimposed on the first vibration or the rotational speed output signal, and whereby the signal processing device of the checking system detects a superposition of the first periodic vibration with the separate second periodic vibration and processes it into a warning signal for the onset of tread rubber separations.

Such a use of the process results in a particularly easy incorporation and integration into already fully developed and tested systems for checking vehicle data, so that only a few alterations need to be made in the necessary devices and in the required electronics, in order to expand the capacity of such a checking system, e.g., an anti-block system, by the important information on whether the onset of tread rubber separations is occurring on a wheel. The use of the available sensors and the evaluation electronics makes it possible to achieve definite information on the onset of tread rubber separations in a particularly economical way, including in mass production.

In a practical embodiment of the invention it can be provided for the calculated mean value to be first adjusted for a first reference value that represents production tolerances of the ABS signal generator (encoder) for the respective wheel.

In a particularly preferred embodiment of the invention it can be provided that the internal tire pressure is determined by way of a pressure recording device parallel to the recording of the rotational speed output signal, whereby deviations from a preset desired value by a predetermined amount lead to a signal that is perceptible by the driver.

Under certain circumstances it can happen that the air pressure inside the tire drops at the onset of tread rubber separations. The change in air pressure, thus in particular the drop in pressure, can have a negative effect on the characteristic signal, in that this signal or the frequency is evened out and therefore not recorded as a deviation. A simultaneous recording of the internal tire pressure can therefore be drawn on as a correlation variable to record dangerous conditions. In particular, and this can be provided according to another advantageous embodiment of the invention, the pressure value determined by way of the pressure recording device is brought into correlation to the rotational speed output signal.

In a practical embodiment of the invention it can further be provided that a deflation detection system (DDS) is used as a pressure recording device with which changes in the rolling circumference of the tire caused by air pressure are determined.

The invention also provides for a method of detecting an onset of tread rubber separation of a pneumatic tire on a vehicle, in which the method includes producing a permanent first periodic vibration, in at least one of each axle and each wheel, proportional to a wheel rotational speed as a speed output signal, feeding the speed output signal to a signal processing device, wherein in the onset of tread rubber separation, the method further comprises superimposing, on a first vibration or the speed output signal, at least one separately defined periodic vibration characteristic of the onset of tread rubber separation and proportional to the wheel rotational speed, detecting the superimposition of the first periodic vibration with the at least one separately defined periodic vibration characteristic of the onset of tread rubber separation in the signal processing device, and producing a warning signal.

The speed output signal may be produced using one of an active and a passive magnetic field sensor. The magnetic field sensor may comprise an encoder. The magnetic field sensor may comprise a rotating member and a stationary member, the magnetic field sensor being situated on a part of the vehicle. The magnetic field sensor may be positioned on a part of the vehicle which is either stationary or rotates with the wheel, the magnetic field sensor producing a periodic magnetic field change in proportion to the wheel rotation speed. The at least one separately defined periodic oscillation may be produced by the onset of tread rubber separation on the at least one wheel, the at least one separately defined periodic oscillation being produced when the wheel experiences the onset of tread rubber separation.

The method may further comprise comparing the speed output signal, after being processed in the signal processing device, with at least one reference and threshold value. The method may further comprise recognizing when the at least one reference or threshold value is exceeded and producing the warning signal when the reference or threshold value is exceeded. The method may further comprise recognizing the superimposition with the at least one separately defined periodic oscillation when the at least one reference or threshold value is exceeded. The method may further comprise recognizing when the at least one reference or threshold value is exceeded and producing the warning signal when the reference or threshold value is exceeded. The comparing may comprise comparing the speed output signal with a speed output signal of at least one other wheel or axle, the at least one other wheel or axle representing the at least one reference or threshold value.

In the signal processing device, the method may further comprise calculating a wheel speed for a preset time interval from the speed output signal, and comparing the wheel speed with one of at least one reference or threshold value, wherein the speed output signal is represented on the basis of a vibration, and wherein the method further comprises determining and storing for several consecutive and defined wheel rotation angles, corresponding times for partial rotations of the wheel determined by the defined wheel rotation angles, within defined count times $T_L$ containing several consecutive wheel rotation angles, calculating and storing a mean wheel rotation speed for at least one wheel rotation within counting intervals from times determined for the partial rotations and their number, comparing the mean rotation speed or a variation with the at least one reference or threshold value, wherein, when the at least one reference or threshold value is exceeded, a warning signal is emitted.

In the signal processing device, the method may further comprise determining and storing for several consecutive and defined wheel rotation angles, corresponding times for partial rotations of the wheel determined by the defined wheel rotation angles, calculating and storing a mean value for several such corresponding times for at least one wheel rotation, determining deviations of the corresponding times from the calculated and stored mean value, and comparing the deviations with the at least one reference or threshold value, wherein, when the at least one reference or threshold value is exceeded, a warning signal is emitted.

In the signal processing device, the method may further comprise determining and storing for several consecutive and defined wheel rotation angles, corresponding times for partial rotations of the wheel determined by the defined wheel rotation angles, calculating and storing, with at least one ALU, frequencies of the corresponding times, calculating and storing for at least one wheel rotation, a mean value of the frequencies, determining deviations of the frequencies from the mean value, and comparing the deviations with the at least one reference or threshold value, wherein, when the at least one reference or threshold value is exceeded, a warning signal is emitted.

In the signal processing device, the method may further comprise determining and storing for several consecutive and defined wheel rotation angles, corresponding times for partial rotations of the wheel determined by the defined wheel rotation angles, subjecting to a frequency analysis, with at least one ALU, a frequency spectrum of the corresponding times in order to detect at least one power spectral density, subjecting to an integration, with at least one ALU, the at least one power spectral density over certain selected frequency intervals, storing the integration, and comparing an integral value of the selected frequency intervals to the at least one reference or threshold value, wherein, when the at least one reference or threshold value is exceeded, a warning signal is emitted.

The selected frequency intervals may be those which correspond to at least one multiple of a wheel rotational frequency. The at least one multiple may comprise lower multiples of the wheel rotational frequency.

In the signal processing device, the method may further comprise determining and storing for several consecutive and defined wheel rotation angles, corresponding times for partial rotations of the wheel determined by the defined wheel rotation angles, calculating and storing, with at least one ALU, at least one instant wheel speed from the corresponding times, calculating and storing for at least one wheel rotation, a mean value of the at least one instant wheel speed, determining deviations from the mean value, and comparing the deviations with the at least one reference or threshold value, wherein, when the at least one reference or threshold value is exceeded, a warning signal is emitted.

In the signal processing device, the method may further comprise determining and storing for several consecutive and defined wheel rotation angles, corresponding times for partial rotations of the wheel determined by the defined wheel rotation angles, calculating and storing, with at least one ALU, at least one instant wheel acceleration from the corresponding times, calculating and storing for at least one wheel rotation, a mean value of the at least one instant wheel acceleration, determining deviations from at least one of the mean value or a zero value, and comparing the deviations with the at least one reference or threshold value, wherein, when the at least one reference or threshold value is exceeded, a warning signal is emitted.

The invention also provides for a system which comprises at least one sensor device arranged at least on each axle, the at least one sensor device adapted to supply a permanently present first periodic oscillation proportional to a wheel rotation speed as a speed output signal. The at least one sensor device comprises one of an active and a passive magnetic field sensor being mounted to one of rotate with the tire and be stationary. The at least one sensor device further comprises one of a magnetically active and passive transmitter device which rotates at the wheel rotation speed relative to a magnetic field sensor, the transmitter device being arranged complementary to the at least one passive and active magnetic field sensor and adapted to produce a periodic magnetic field change in proportion to the wheel rotation speed. At least one signal processing device for processing and evaluating the speed output signal is utilized. The signal processing device is adapted to produce one of an output control and a warning signal. A display device is provided for displaying at least one of the output control and the warning signal. The system detects at least one separately defined periodic oscillation related to the onset of tread rubber separation in proportion to the permanently present first periodic oscillation. In the onset of tread rubber separation, the at least one separately defined periodic oscillation is superimposed on at least one of the permanently present first periodic oscillation and the speed output signal.

The at least one signal processing device may comprise at least one filtering device for filtering noise. The at least one signal processing device may comprise at least one storage device for storing one of reference and threshold values. The at least one signal processing device may comprise a comparator which, after processing, compares a respective speed output signal with one of at least one reference value and at least one threshold value, and detects a superimposition of the first periodic oscillation with the at least one separately defined periodic oscillation, such that when the reference value or the threshold value is exceeded, a warning signal is produced.

The speed output signal is an input signal for the at least one signal processing device and the at least one signal processing device may further comprise one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measures corresponding times for partial rotations of the wheel determined by the defined wheel rotation angles. The times are measured by ascertaining time differences between two decreasing or increasing edges of the square wave signal that correlate with the times for the partial rotations, at least one counting device is connected in parallel to one of the at least one time control device and the at least one timer and receiving the single-pulse signal. The at least one counting device ascertains one of the number of single pulses obtained and measured times within a defined count time $T_L$. At least one of an accumulator and a storage device is used for storing the measured corresponding times for partial rotations of the wheel and the number of single pulses obtained within several successive count times $T_L$. A computer circuit is used for calculating and storing a average wheel rotation velocity within the count times $T_L$ for at least one wheel rotation from the times ascertained for the partial rotations and their numbers within the count times $T_L$. A comparator compares one of the average wheel rotation velocity or their course with one of at least one reference value and at least one threshold value, wherein, when the at least one reference value or the at least one threshold value is exceeded by the averaged wheel rotation velocity or their course, a warning signal is activated.

The speed output signal is an input signal for the at least one signal processing device and the at least one signal processing device may further comprise one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measures corresponding times for partial rotations of the wheel determined by the defined wheel rotation angles, with the times being measured by ascertaining time differences between two decreasing or increasing edges of the square wave signal that correlate with the times for the partial rotations. At least one of an accumulator and a storage device is used for storing the measured corresponding times for partial rotations of the wheel. A computer circuit calculates an average value from the measures corresponding times for partial rotations of the wheel and for calculating deviations of the measures corresponding times for partial rotations of the wheel from the average value. A comparator compares the deviations with one of at least one reference value and at least one threshold value, wherein, when the at least one reference value or the at least one threshold value is exceeded by the deviations, a warning signal is activated.

The speed output signal is an input signal for the at least one signal processing device and the at least one signal processing device may further comprise one of at least one filter and at least one low-pass filter for filtering out high-frequency noise portions of the speed output signal. One of at least one comparator circuit and at least one Schmitt trigger is used for converting the speed output signal into a single-pulse square wave signal. One of at least one time control device and at least one timer which, for several successive and defined wheel rotation angles, is used for measuring corresponding times for partial rotations of the wheel determined by the defined wheel rotation angles. The times are measured by ascertaining time differences between two decreasing or increasing edges of the square wave signal that correlate with the times for the partial rotations. At least one ALU communicates with one of the at least one time control device and the at least one timer. At least one of an accumulator and a storage device communicates with the at least one ALU. A computer circuit is used for calculating an average value of several successively calculated frequencies and for calculating deviations of the calculated frequencies from the average value. A comparator is used for comparing the deviations with one of at least one reference value and at least one threshold value, wherein when the at least one reference value or the at least one threshold value is exceeded by the deviations, a warning signal is activated.

The speed output signal is an input signal for the at least one signal processing device and the at least one signal processing device may further comprise one of at least one filter and at least one low-pass filter for filtering out high-frequency noise portions of the speed output signal. One of at least one comparator circuit and at least one Schmitt trigger is used for converting the speed output signal into a single-pulse square wave signal. One of at least one time control device and at least one timer which, for several successive and defined wheel rotation angles, is used for measuring corresponding times for partial rotations of the wheel determined by the defined wheel rotation angles. The times are measured by ascertaining time differences between two decreasing or increasing edges of the square wave signal that correlate with the times for the partial rotations. At least one first ALU communicates with the at least one time control device and the at least one timer. At least one second ALU communicates with the at least one first ALU. At least one of an accumulator and a storage device is used for storing several successively ascertained integrals. A comparator is used for comparing the ascertained integrals with one of at least one reference value and at least one threshold value, wherein, when the at least one reference value or the at least one threshold value is exceeded by the ascertained integrals, a warning signal is activated.

The speed output signal may be fed from some portion of an anti-locking braking system. An anti-locking braking system may be coupled to the signal processing device.

The invention also provides for a method for ascertaining an onset of tread rubber separation condition of a pneumatic tire on a motor vehicle, wherein the method comprises sensing a permanently present first periodic oscillation proportional to a wheel rotation speed of at least one wheel of the motor vehicle. The at least one wheel is adapted to produce at least one periodic oscillation characteristic of the onset of tread rubber separation condition when the wheel experiences any tread rubber separation. The sensing is performed by at least one sensor device disposed adjacent the at least one wheel. A speed output signal is fed from the at least one sensor device to at least one filter which filters out high-frequency noise portions of the speed output signal. The speed output signal is converted into a square wave signal of single pulses using one of at least comparator circuit and at least one Schmitt trigger. The single pulses are processed using at least one processing device. At least one output is produced. The at least one output is stored in a storage device. The at least one output is subjected to a calculation with a computer circuit to produce at least one value. The at least one value is compared with one of at least one reference value and at least one threshold value using a comparator. At least one warning signal is produced on a display device when the at least one value exceeds the at least one reference value or the at least one threshold value, wherein the at least one warning signal is produced when the tire experiences the onset of tread rubber separation.

The processing may be performed by two processing devices, one processing device comprising a time control device and the other processing device comprising a counting device. The processing may be performed by the at least one processing device which comprises a time control device. The processing may be performed by two processing devices, one processing device comprising a time control device and the other processing device comprising a computer.

The invention also provides for a method for ascertaining an onset of tread rubber separation of a pneumatic tire on a motor vehicle, wherein the method comprises sensing a permanently present first periodic oscillation proportional to a wheel rotation speed of at least one wheel of the motor vehicle. The at least one wheel is capable of producing at least one periodic oscillation characteristic of the onset of tread rubber separation when the wheel experiences any tread rubber separation. The sensing is performed by at least one sensor device disposed adjacent the at least one wheel. A speed output signal is fed from the at least one sensor device to at least one filter which filters out high-frequency noise portions of the speed output signal. The speed output signal is converted into a square wave signal of single pulses using one of at least one comparator circuit and at least one Schmitt trigger. The single pulses are processed using one of at least one time control device and at least one timer and producing a frequency spectrum. The frequency spectrum is fed to a computer and a frequency analysis is performed using a Fourier transform to ascertain power spectral densities. The power spectral densities are integrated using a computer and an integral so as to produce ascertained integrals. The ascertained integrals are fed to at least one a storage device. The ascertained integrals are compared with one of at least one reference value and at least one threshold value using a comparator. At least one warning signal is produced on a display device when the ascertained integrals exceed the at least one reference value or the at least one threshold value, wherein the at least one warning signal is produced when the tire experiences the emergency running condition.

The invention also provides a system for ascertaining an onset of tread rubber separation of a pneumatic tire on a motor vehicle, wherein the system comprises a plurality of wheel sensor devices disposed on the vehicle. Each wheel sensor device comprises one of an active or passive magnetic field sensor that is disposed adjacent each wheel of the vehicle. Each wheel sensor device supplies a permanently present first periodic oscillation in proportion to a wheel rotation speed in the form of a speed output signal. A signal processing device receives the speed output signal. The signal processing device comprises a plurality of low-pass filters for filtering out high-frequency noise portions of the speed output signal. A Schmitt trigger is connected to each low-pass filter. A time control device is connected to each Schmitt trigger. An accumulator is connected to the time control devices. A computer circuit is connected to the accumulator. A comparator is connected to the computer circuit. A display device is connected to the comparator. The signal processing device processes and evaluates the speed output signal. The signal processing device is adapted to produce a warning signal on the display device when the wheel experiences any tread rubber separation.

The signal processing device may further comprise a counting device connected to each Schmitt trigger and connected to the accumulator.

The invention also provides a system for ascertaining an onset of tread rubber separation of a pneumatic tire on a motor vehicle, wherein the system comprises a plurality of wheel sensor devices disposed on the vehicle. Each wheel sensor device comprises one of an active or passive magnetic field sensor being disposed adjacent each wheel of the vehicle. Each wheel sensor device supplies a permanently present first periodic oscillation in proportion to a wheel rotation speed in the form of a speed output signal. A signal processing device receives the speed output signal. The signal processing device comprises a plurality of low-pass filters for filtering out high-frequency noise portions of the speed output signal. A Schmitt trigger is connected to each low-pass filter. A time control device is connected to each Schmitt trigger. An ALU is connected to each time control device. An accumulator is connected to each ALU. A computer circuit is connected to the accumulator. A comparator is connected to the computer circuit. A display device is connected to the comparator. The signal processing device processes and evaluates the speed output signal and the signal processing device is adapted to produce a warning signal on the display device when the wheel experiences any tread rubber separation.

The invention also provides a system for ascertaining an onset of tread rubber separation of a pneumatic tire on a motor vehicle, wherein the system comprises a plurality of wheel sensor devices disposed on the vehicle. Each wheel sensor device comprises one of an active or passive magnetic field sensor being disposed adjacent each wheel of the vehicle. Each wheel sensor device supplies a permanently present first periodic oscillation in proportion to a wheel rotation speed in the form of a speed output signal. A signal processing device receives the speed output signal. The signal processing device comprises a plurality of low-pass filters for filtering out high-frequency noise portions of the speed output signal. A Schmitt trigger is connected to each low-pass filter. A time control device is connected to each Schmitt trigger. A first ALU is connected to each time control device. A second ALU is connected to each first ALU. An accumulator is connected to each second ALU. A comparator is connected to the accumulator, and a display device is connected to the comparator. The signal processing device processes and evaluates the speed output signal and the signal processing device is adapted to produce a warning signal on the display device when the wheel experiences any tread rubber separation.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a schematic diagram for arranging a device or system according to the invention in a motor vehicle;

FIG. 2 shows a diagrammatic representation of a sensor device for the wheel rotational speed available in the prior art and provided with an active transmitting device;

FIG. 3 shows a diagrammatic representation of a sensor device for the wheel rotational speed available in the prior art and provided with a passive transmitting device;

FIG. 5b shows an enlarged representation (magnifier) of the time intervals marked in FIG. 5a;

FIG. 6b shows the time response of a vibration determined with the aid of sensor devices and proportional to the rotational speed of the wheel with superimposed vibration of the $n^{th}$ order of the tire period (superimposed rotational speed output signal) compared to the normal rotational speed output signal according to FIG. 6a;

FIG. 7b shows the frequencies plotted on a time axis and determined by generating reciprocal values from the zero passage times according to FIG. 7a;

FIG. 7c shows the wheel speed plotted on a time axis and calculated from the zero passage times according to FIG. 7a;

DETAILED DESCRIPTION OF THE PRESENT INVENTION

Figure 4:
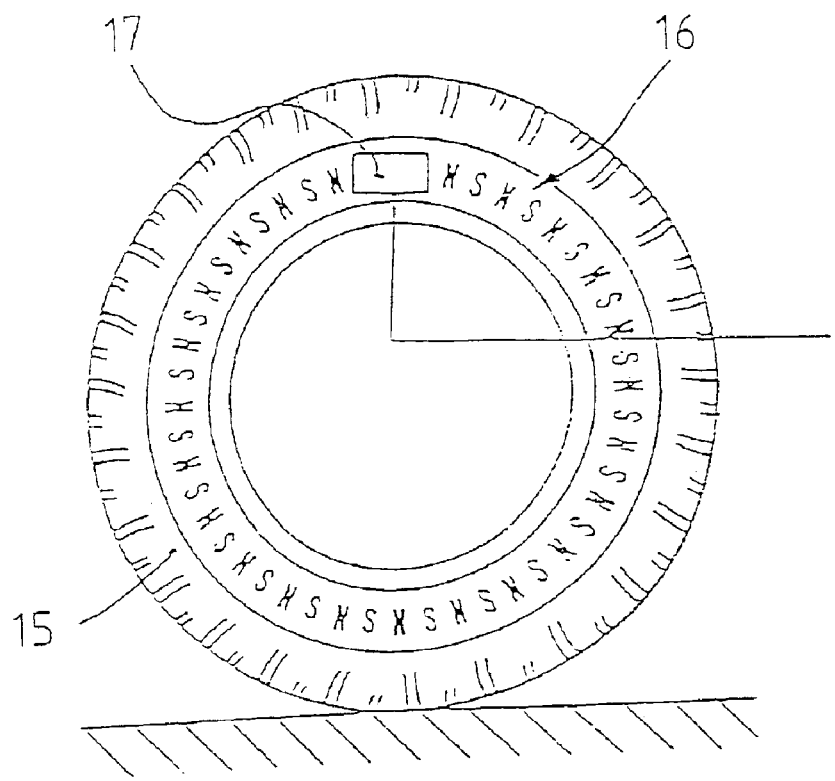
FIG. 4 shows a diagrammatic representation of a sensor device for the wheel rotational speed available in the prior art and provided with an active transmitting device in the form of permanent-magnet areas arranged in the side wall of the tire.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows the arrangement of a device according to the invention in a motor vehicle. A CPU or evaluation unit 1 is connected to sensor devices 2–5, which in turn are assigned to the individual wheels 6–9.

The sensor devices 2–5 detect the rotational speed output signals of the individual wheels and transmit them to the CPU 1, which is connected on the output side to a display and warning device 10, e.g., to an optical warning display arranged on the dashboard in the driver's field of view.

The CPU 1 contains a signal processing unit and includes all the devices for evaluating and comparing the rotational speed output signals of the individual wheels and for producing a warning signal in the display device 10.

FIG. 2 shows the diagrammatic representation of the sensor device that can be installed in the system according to the invention. As is known per se, each active transmitting device includes a magnet wheel 11 which rotates with the respective wheel. The magnet wheel 11 produces a periodic change in the magnetic field in a magnetic field sensor 12. This change is evaluated and processed in the signal processing device belonging to the CPU 1 as a rotational speed output signal in the form of a periodic vibration proportional to the rotational speed of the wheel.

FIG. 3 shows a diagrammatic representation of an alternative sensor device also available in the prior art. Here a passive transmitting device includes a metallic wheel 13 that is cogged on its circumference. The rotational speed of the wheel 13 is detected by a magnetic field sensor 14 embodied for this purpose.

FIG. 4 shows another known alternative of a sensor device in a diagrammatic representation. Here an active transmitting device is arranged in the form of permanent-magnet areas 16 arranged in a tire side wall 15. The rotational speed of a tire equipped in this way is then detected by an appropriately embodied magnetic field sensor 17.

Figure 5A:
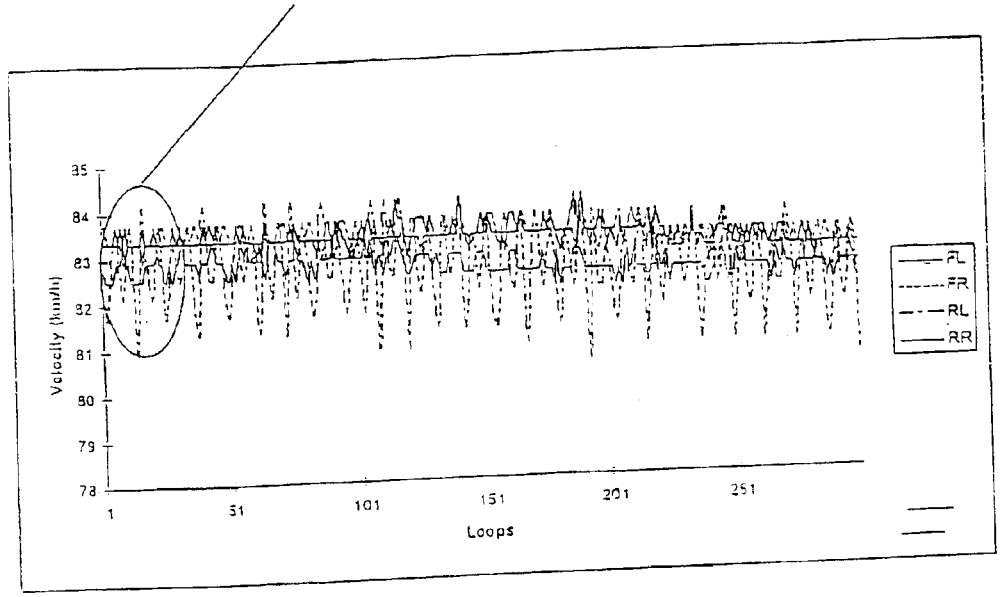
FIG. 5a shows a diagram showing the evaluation of the processed wheel speeds of the individual wheels within defined counting intervals (loops) determined with the aid of the sensor devices by way of the wheel rotational speed.

FIG. 5a shows a diagram which illustrates the evaluation within defined counting intervals $T_L$ (loop time) of the wheel speeds of the individual wheels processed in the signal processing device and determined with the aid of sensor devices by way of the wheel rotational speed.

The defined counting intervals are represented here on the x-axis, whereas the y-coordinate contains the wheel speeds of the individual wheels. The diagram thus shows, synchronously, the wheel speeds of all four wheels, namely; the left front wheel (FL=front left), the right front wheel (FR=front right), the left rear wheel (RL=rear left) and the right rear wheel (RR=rear right).

Figure 5B:
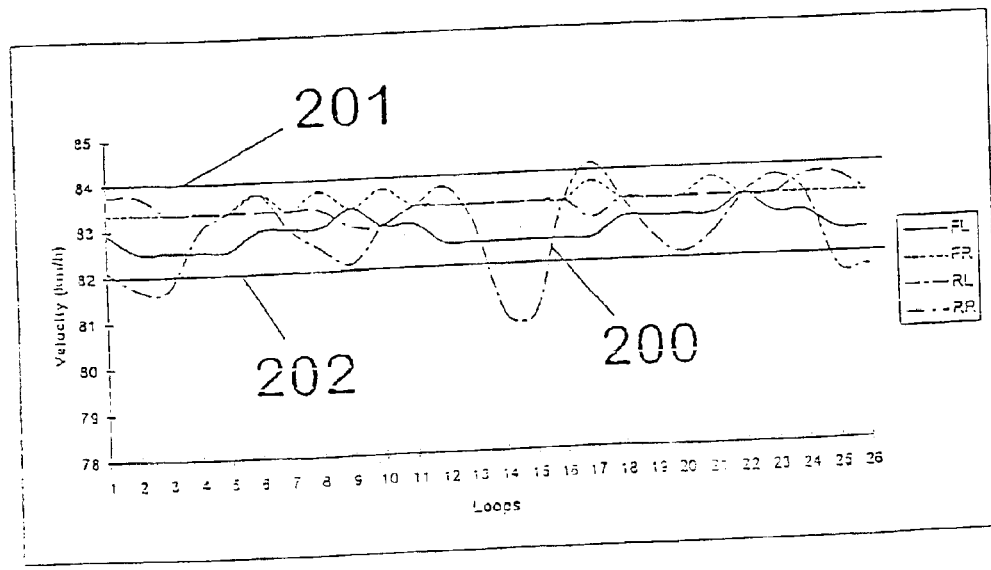

The different wheel speeds can be seen more clearly in FIG. 5b, which shows an enlarged representation (magnifier) of the time interval 24 referenced in FIG. 5a.

FIGS. 5a and 5b thus show the evaluation according to the process or system for a vehicle, in which the left rear wheel (RL) shows the onset of tread rubber separations.

It can already be seen from a very simple speed evaluation that the speed variation of the left rear wheel differs in a clearly detectible manner from the speed variations of the other wheels, whereby approximately 11 counting intervals (loops) here represent one wheel revolution. The speed curve 200 represents the speed variation of the left rear (RL) wheel, the characteristic of which curve is produced by a separately defined periodic vibration proportional to the wheel rotational speed, can be easily verified with customary systems by way of reference or threshold values 201 and 202 for the wheel speed, and detected as a speed curve representative of the onset of tread rubber separations. This can occur even if such is influenced by body or structural vibrations and resonances.

FIGS. 6a and 6b and 7a–7e show the clear recognizability of a separately defined vibration superimposed on the rotational speed output signal, which vibration is characteristic of the onset of tread rubber separations and proportional to the wheel rotational speed. This vibration is produced by typical unevennesses in the form of out-of-balances.

Figure 6A:
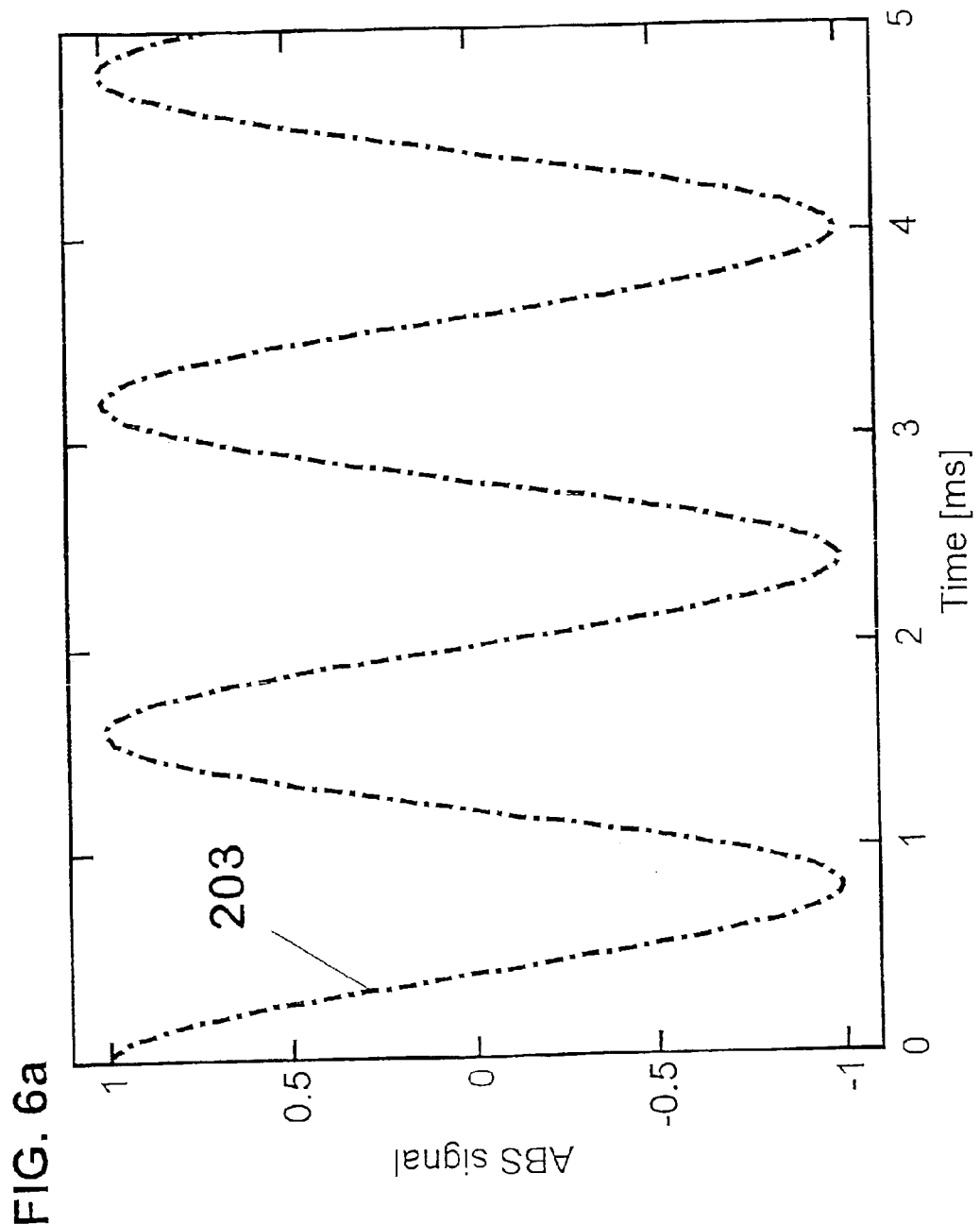
FIG. 6a shows the time response of an undisturbed vibration determined with the aid of sensor devices and proportional to the wheel rotational speed (normal rotational speed output signal) at constant speed.

In these diagrammatic and only qualitative representations, FIG. 6a first shows the time response, represented by the curve 203, of a normal rotational speed output signal, e.g., an ABS signal, at constant speed without the onset of tread rubber separations, i.e., in normal condition.

If irregular vibrations now occur, the time response of the superimposed rotational speed output signal (shown in comparison to the non-superimposed, i.e., normal rotational speed output signal according to curve 203) is received in a manner that is shown qualitatively by the curve 204.

Figure 6B:
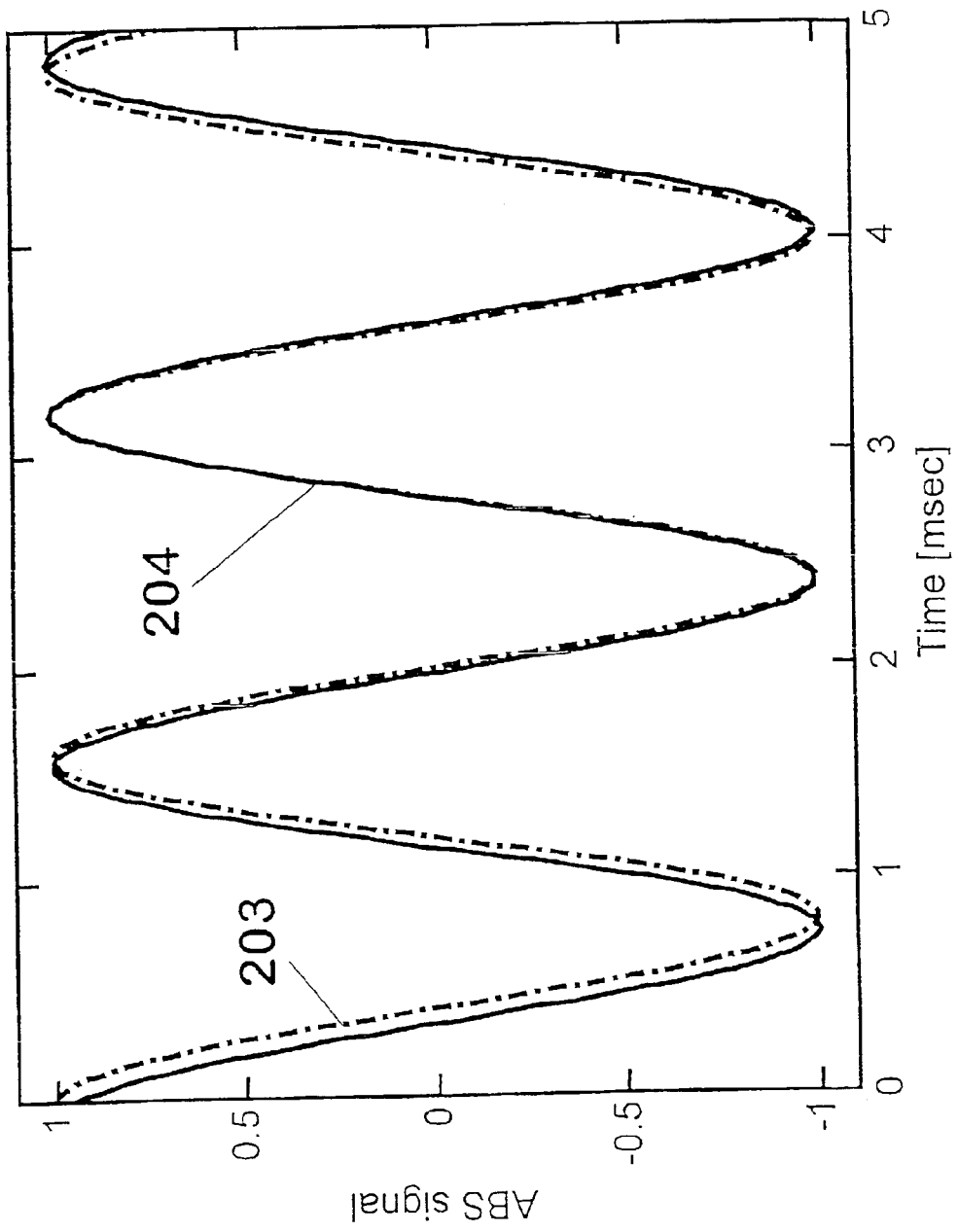
Figure 7A:
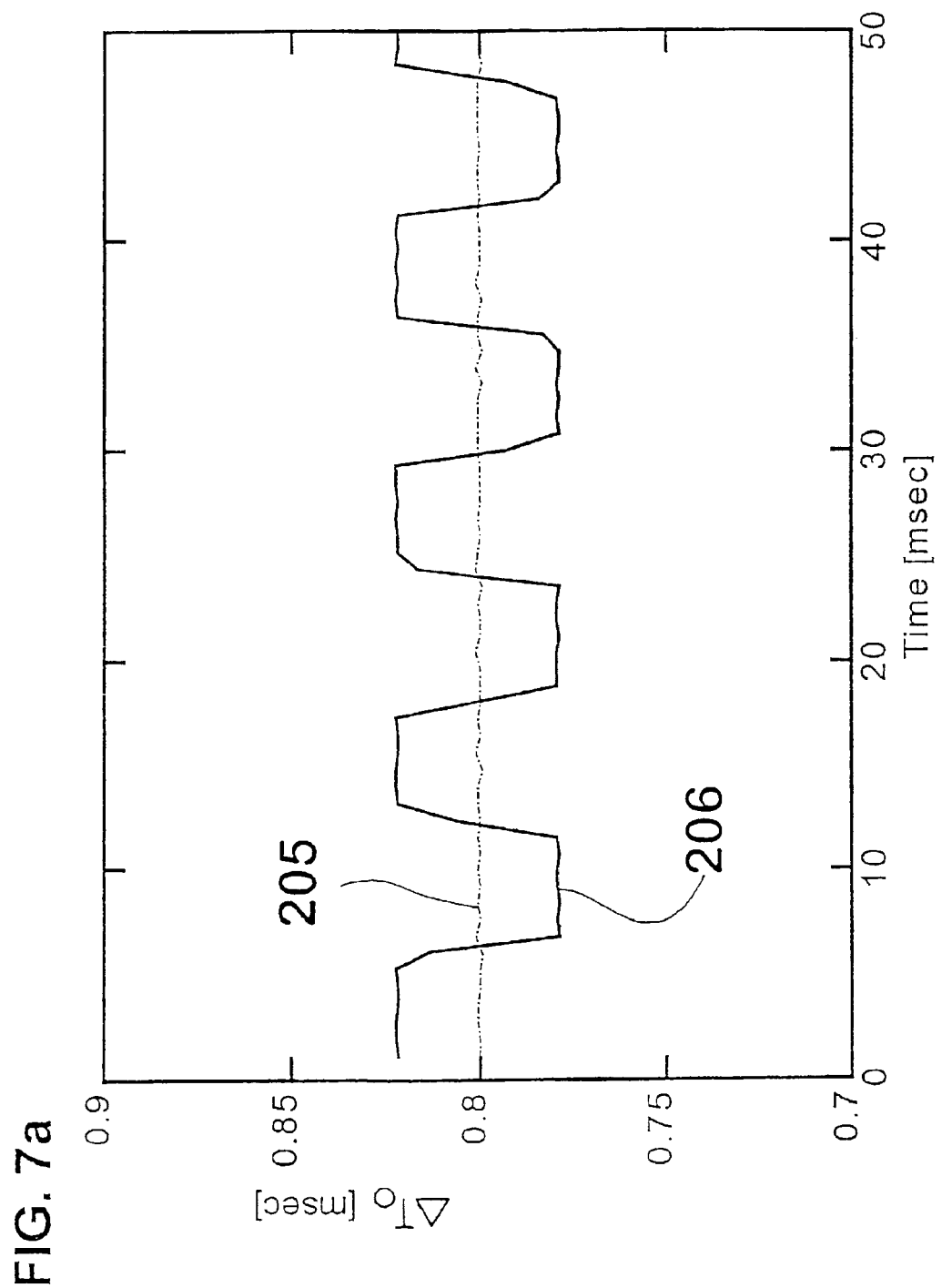
FIG. 7a shows the zero passage times $\Delta T_{0(1)}$ (t) (zero passage times signal) of the normal and the superimposed rotational speed output signal according to FIG. 6b, plotted on a time axis, which were determined with the aid of a timer measuring the time differences between the zero passages of the individual pulses received.

FIG. 7a shows the determined times plotted on a time axis for the defined partial rotations of the wheel determined by the defined wheel rotational angle in the form of a zero passage times signal $\Delta T_{0(1)}$ (t) of the normal and superimposed rotational speed output signal according to FIG. 6b on the basis of curves 205 and 206, which was determined with the aid of a timer measuring the times/time differences between the zero passages of the individual pulses received.

It can thus be seen that the zero passage times of the normal rotational speed output signal according to FIG. 6b, in accordance with curve 205, remain essentially constant and are approximately 0.8 msec, apart from disturbing influences shown by slight fluctuations, such as can occur, e.g., due to changes in speed, road surface, signal noises, etc.

In contrast, the zero passage times of the superimposed rotational speed output signal according to FIG. 6b can be seen in curve 206 as clearly noticeable periodic deviations of approximately 0.02 msec. These deviations fluctuate with regard to their absolute value between approximately 0.78 msec and approximately 0.82 msec.

Figure 7B:
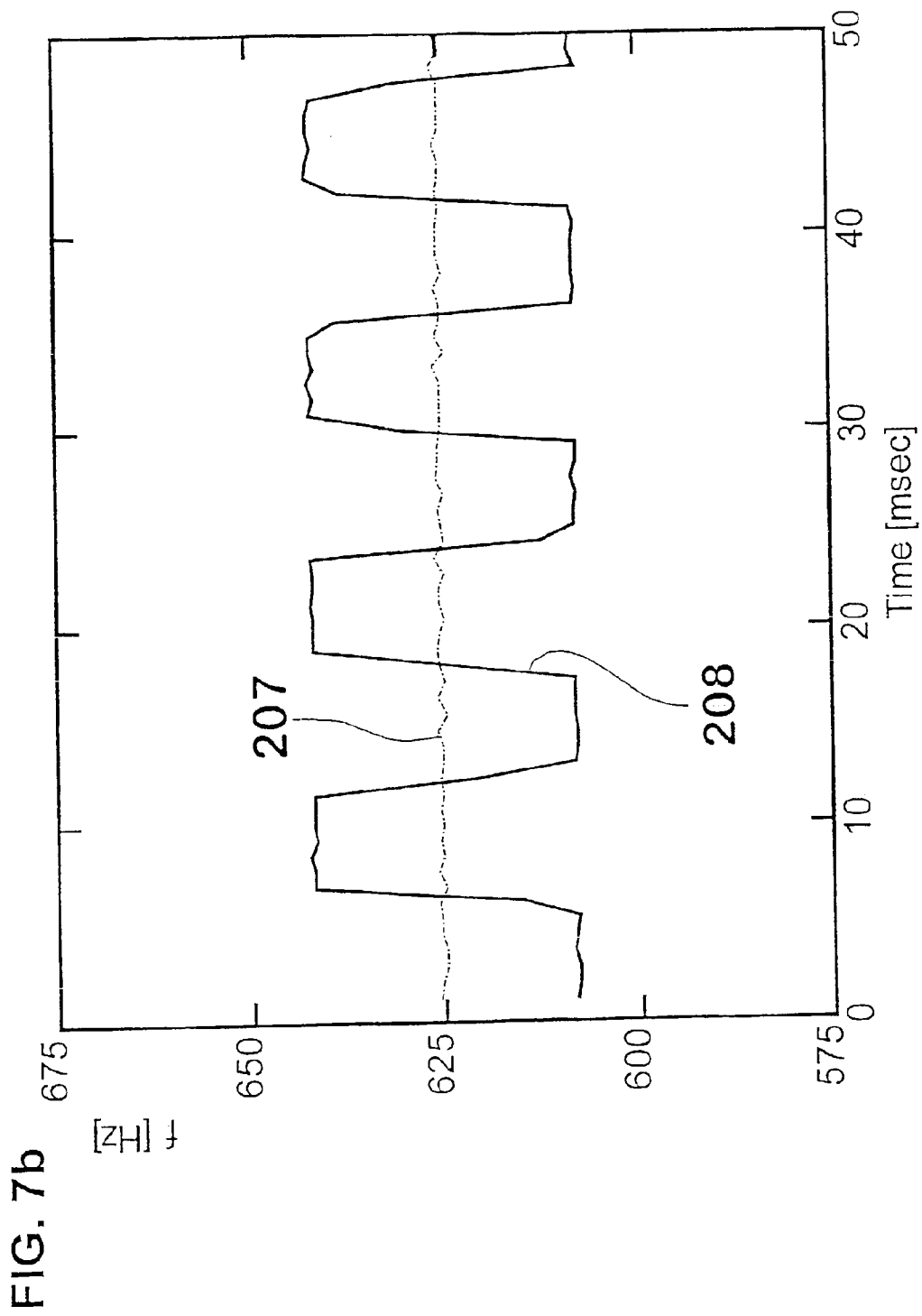

In this context, FIG. 7b shows the frequencies of the zero passage times according to FIG. 7a, plotted on a time axis and determined by generating reciprocal values according to the formula $f_{(i)}$ (t)=0.5/$\Delta T_{0(i)}$ (t) described above. Here too, it is clear that the determined frequencies of the zero passage times of the normal rotational speed output signal (according to FIG. 6b and represented with curve 207) remain essentially constant and in this case are approximately 625 Hz, again apart from disturbing influences shown by slight fluctuations.

In contrast, the correspondingly determined frequencies of the zero passage times of the superimposed rotational speed output signal according to FIG. 7a (and represented with curve 208) are clearly noticeable and particularly clearly detectible periodic deviations, whereby the frequencies fluctuate with regard to their absolute value between approximately 610 Hz and approximately 640 Hz.

Figure 7C:
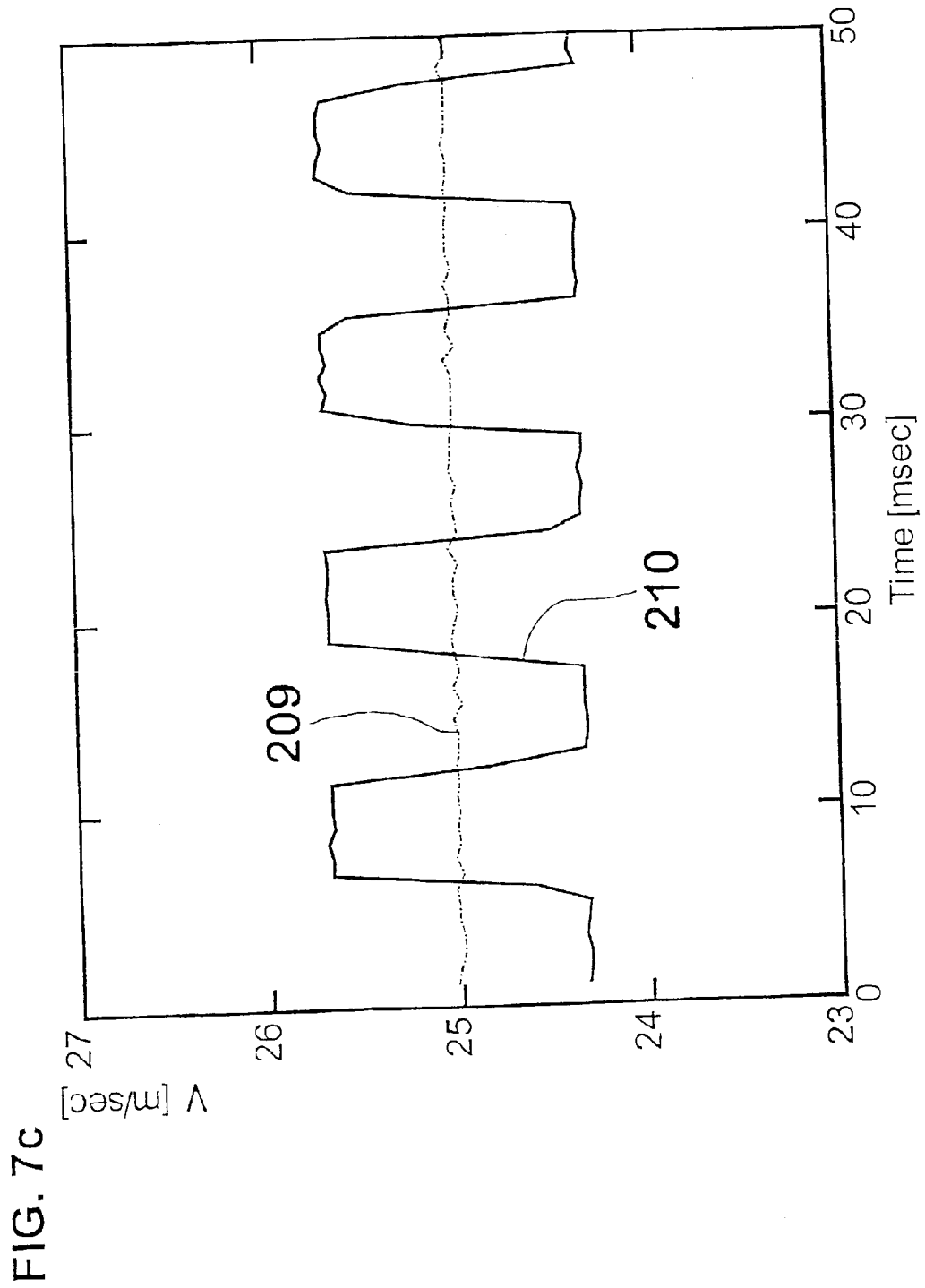

In this context, FIG. 7c shows the wheel speeds plotted on a time axis and determined from zero passage times in accordance with FIG. 7a according to the formula $v_{(i)}(t)=0.02$ m/$\Delta T_{0(i)}$ (t) described above. Here too, it is clear that the wheel speeds determined from the normal rotational speed output signal, according to curve 209, remain essentially constant and in this case are approximately 25 m/sec. This is so, while, in contrast, the wheel speeds, determined from the superimposed rotational speed output signal (and represented in curve 210) feature clearly detectible periodic deviations, whereby the wheel speeds fluctuate with regard to their absolute value between approximately 24.2 m/sec. and approximately 25.8 m/sec.

Figure 7D:
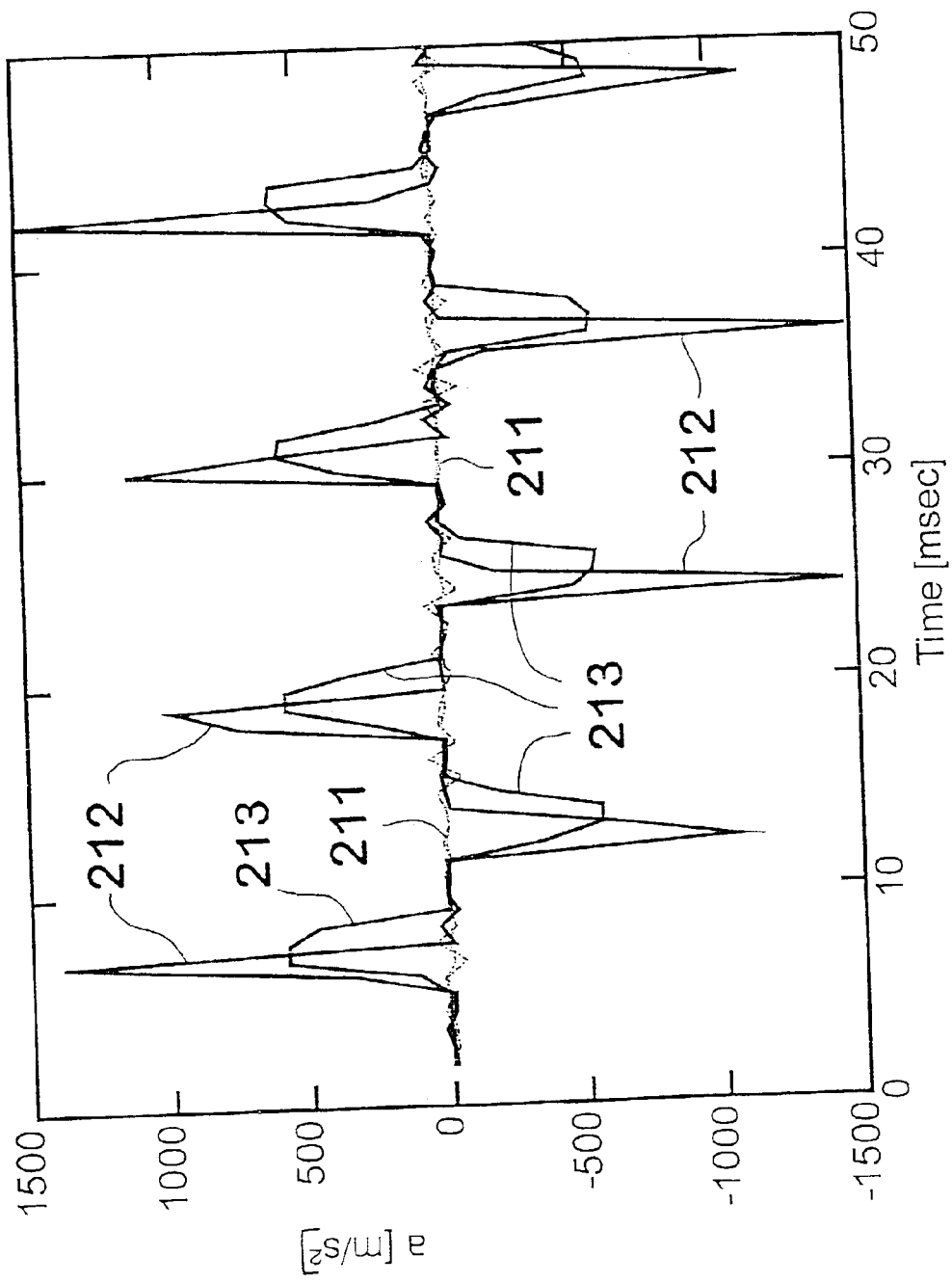
FIG. 7d shows the wheel acceleration plotted on a time axis and calculated from the wheel speeds according to FIG. 7c.

FIG. 7d shows the wheel acceleration plotted on a time axis and calculated from the wheel speeds according to FIG. 7c according to the formula $a_{(i)}(t)=[v_{(i)}-v_{(i-1)}]/\Delta T_{0(i)}$ (t) described above. Here it is discernible that the wheel accelerations, represented in curve 211 and determined from the wheel speeds of the normal rotational speed output signal, remain essentially constant. In contrast, the wheel accelerations according to curve 212, determined from the wheel speeds of the superimposed rotational speed output signal, exhibit clearly detectible periodic deviations. In this case, the curve 213 shows the wheel accelerations of curve 212 filtered through mean value formation. Such a filtering can be useful at times, since the acceleration curves are often particularly noise-corrupted because of the roughening character of a differentiation, so that a more reliable and easier evaluation can be made after the filtering.

Figure 7E:
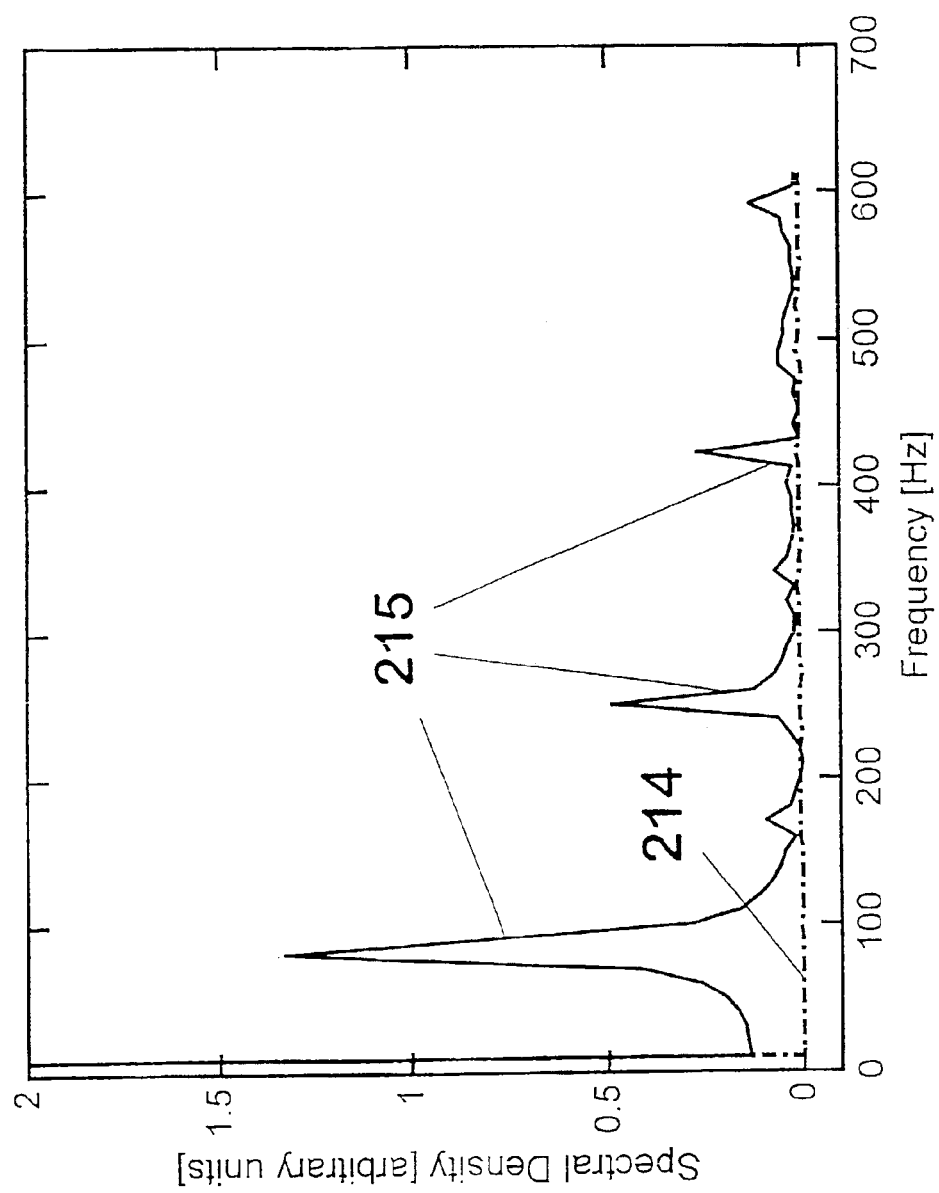
FIG. 7e shows the power spectral density determined with the aid of a frequency analysis of the zero passage times signal according to FIG. 7a, plotted by the frequency.

FIG. 7e shows the spectral density determined with the aid of a frequency analysis of the zero passage times signal according to FIG. 7a. In this case, this is accomplished with the aid of a fast Fourier transformation (FFT), plotted by the frequency. It can be recognized that the spectral density according to curve 215, determined from the zero passage times signal of the superimposed rotational speed output signal, shows clear peaks compared to the spectral density according to curve 214, which is determined from the zero passage times signal of the normal rotational speed output signal. The peaks shown here result, in form and arrangement, from a harmonious vibration of the $13^{th}$ order of the tire period produced with the aid of 13 indentations distributed evenly over the circumference on an incipient tread rubber separation support body (not shown). A support body having such indentations is known from copending U.S. patent application Ser. No. 09/514,254 (based upon DE 199 08 701) in the name of BECHERER et al, the disclosure of which is expressly incorporated by reference in its entirety. In this regard, the frequency intervals to be considered can be dependent on the order of the superimposed vibration and on the wheel speed. For further evaluation the integral is formed in such frequency ranges through the curves of spectral power density and compared to reference or threshold values or with one another.

Figure 7F:
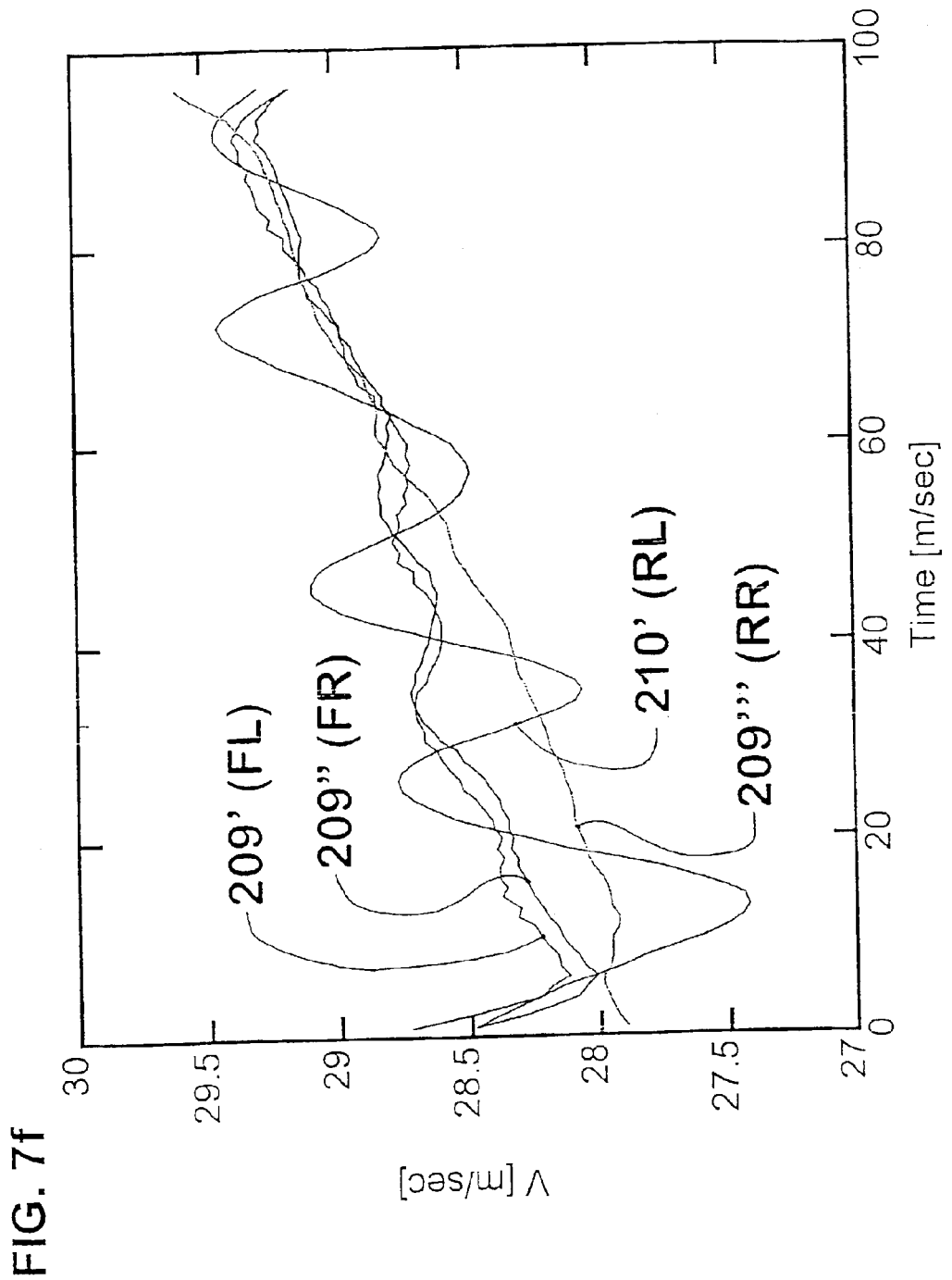
FIG. 7f shows the wheel speeds of all four wheels plotted on a time axis and calculated from the zero passage times after the evaluation of real rotational speed output signals recorded on the moving vehicle.

In contrast to the above qualitative representations, FIG. 7f shows the evaluation of real rotational speed output signals recorded on the vehicle in motion. Here the wheel speeds of all four wheels, determined from the zero passage times according to the formula $v_{(i)}$ (t)=0.02 m/$\Delta T_{0(i)}$ (t) described above, are shown, in a way that is similar to the qualitative representation for one wheel in FIG. 7c. For better recognizability and to reduce the influence of the signal noise, an averaging was conducted here over six consecutive calculations of the zero passage times (six side signals).

The absolutely certain detection of the onset of tread rubber separations, made possible by the inventive process under real conditions, is particularly clear with the aid of this evaluation. The wheel speeds, in accordance with curves 209' (FL), 209" (FR) and 209'" (RR), determined from the normal rotational speed output signal, remain essentially constant or increase approximately uniformly. This is the case apart from disturbance factors and signal noises, even during the increase in speed (acceleration) present here. In contrast, the wheel speeds determined from the superimposed rotational speed output signal of the left rear wheel (RL), exhibiting the onset of tread rubber separations in accordance with curve 210', exhibit clearly detectible periodic deviations.

Figure 8:
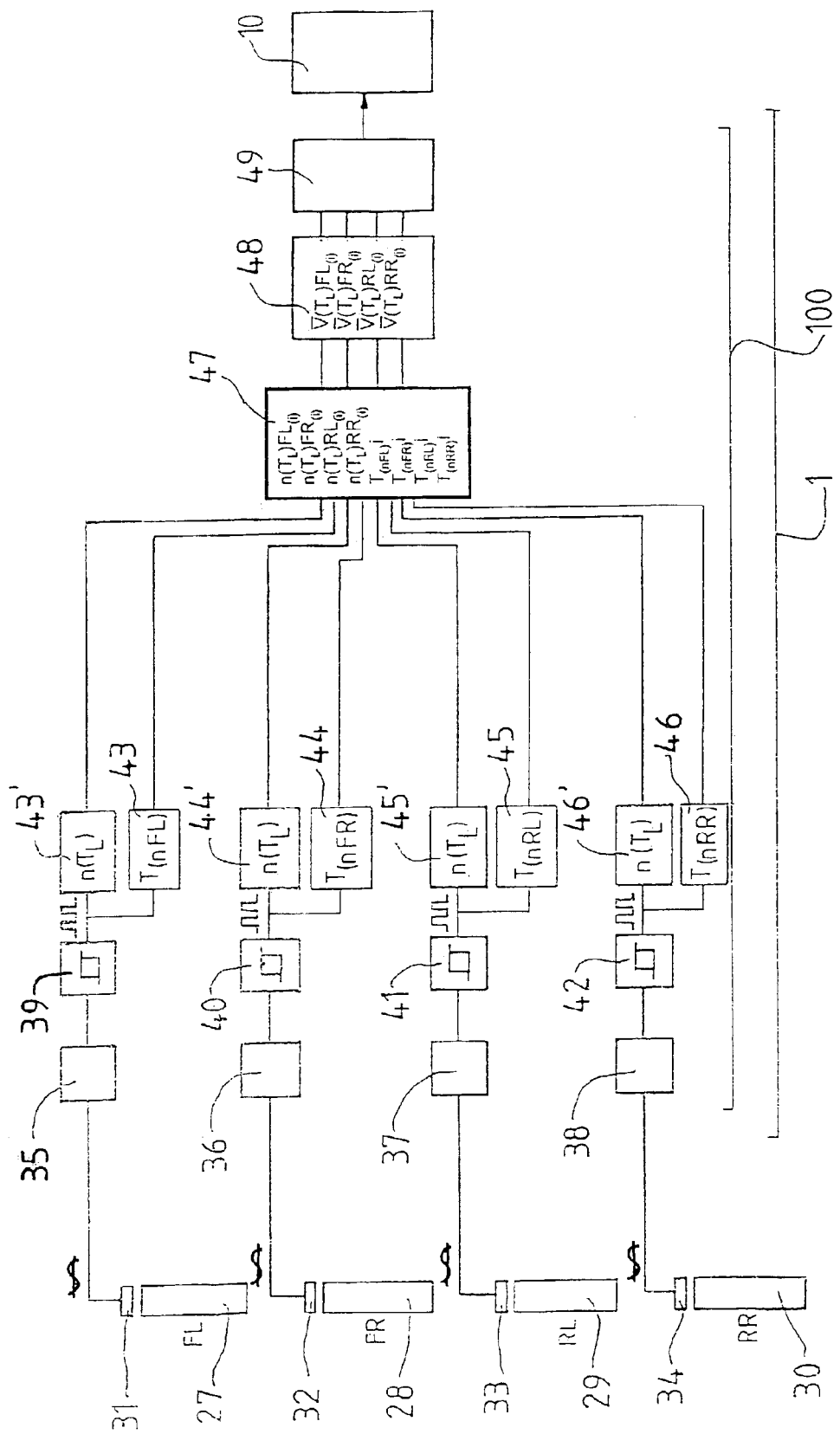
FIG. 8 shows a diagrammatic representation of a signal processing of a device according to the invention as a flow chart, the signal processing being based on the evaluation according to the process of the numbers of individual pulses received within a defined counting interval $T_L$ (loop time) of the normal or superimposed rotational speed output signal.

FIG. 8 shows a diagrammatic representation of a signal processing of a device or system according to the invention. The signal processing is based on an evaluation according to the process of the numbers of individual pulses received within a defined counting interval $T_L$ (loop time) of the normal or superimposed rotational speed output signal. With the processing model shown here, a mean wheel rotational speed within defined counting intervals $T_L$ containing several consecutive wheel rotational angles, is determined from the times determined for the partial rotations, and their number for one or more wheel revolutions within the counting intervals $T_L$ (loop time) is also considered.

First the sensor devices arranged on the individual wheels front left (FL), front right (FR), rear left (RL) and rear right (RR) are shown diagrammatically, which sensor devices are made up of the active transmitting devices 27–30 embodied as magnet wheels according to FIG. 2 and the respectively assigned magnetic field sensors 31–34.

The rotational speed output signals detected by the sensor devices are then transmitted to the signal processing device 100 belonging to the CPU 1. These signals are filtered of high-frequency noise components with the aid of the low-pass filters 35–38. Then, the vibration representing the rotational speed output signal is converted into a rectangular signal of individual pulses by Schmitt triggers 39–42.

The individual impulses from the rotational speed output signals of the individual wheels produced in this way are then sent to the timers 43 through 46. These timers 43–46 measure the corresponding times for several consecutive and defined wheel rotational angles for the partial rotations of the wheel determined by the defined wheel rotational angle. The measurement of the times is made by determining the time differences (zero passage times) between two ascending or descending sides of the rectangular signal correlating to the times for the partial rotations.

Parallel to this, the individual pulses of the rectangular signal are fed to the counters 43' through 46' in order to determine the number n ($T_L$) of the individual pulses received or the times measured within a defined counting interval $T_L$.

The numbers of the individual pulses received of several consecutive counting intervals, here the numbers n $(T_L)_{FL(i)}$, n $(T_L)_{FR(i)}$, n $(T_L)_{RL(1)}$, and n $(T_L)_{RR(i)}$ of 10 consecutive counting intervals (i=1–10) of the respective processed rotational speed output signal of the individual wheels, and the determined times for the partial rotations of the wheel determined by the defined wheel rotational angle, are then downloaded into the accumulator 47. These are further processed by a downstream computer circuit 48 in which a calculation, and if necessary storage, occurs of the mean wheel rotational speeds V $(T_L)_{FL(i)}$, V $(T_L)_{FR(i)}$, V $(T_L)_{RL(i)}$, and V $(T_L)_{RR(i)}$ within the counting intervals $T_L$ for one or more wheel revolutions from the times determined for the partial rotations and their numbers within the counting intervals $T_L$.

The mean wheel rotational speeds are then compared in a comparator 49 to reference and/or threshold values, whereby if a preset difference to the reference and/or threshold values is exceeded, the comparator 49 transmits a signal to the display device 10, which is arranged on the dashboard in the visual range of the driver.

The CPU 1 also contains devices (not shown in detail here) for energy supply and transmission, possibly for signal amplification and signal transmission, cooling devices, etc., as are usually available and necessary in such units also called microcomputers.

The timers 43 through 46 and the counters 43' through 46', (and similarly the timers shown in FIGS. 9 and 10), can also each be embodied here as a "multiplex" device, which processes in short intervals the individual rotational speed output signals of the axles or wheels in a chronologically sequential manner.

Figure 9:
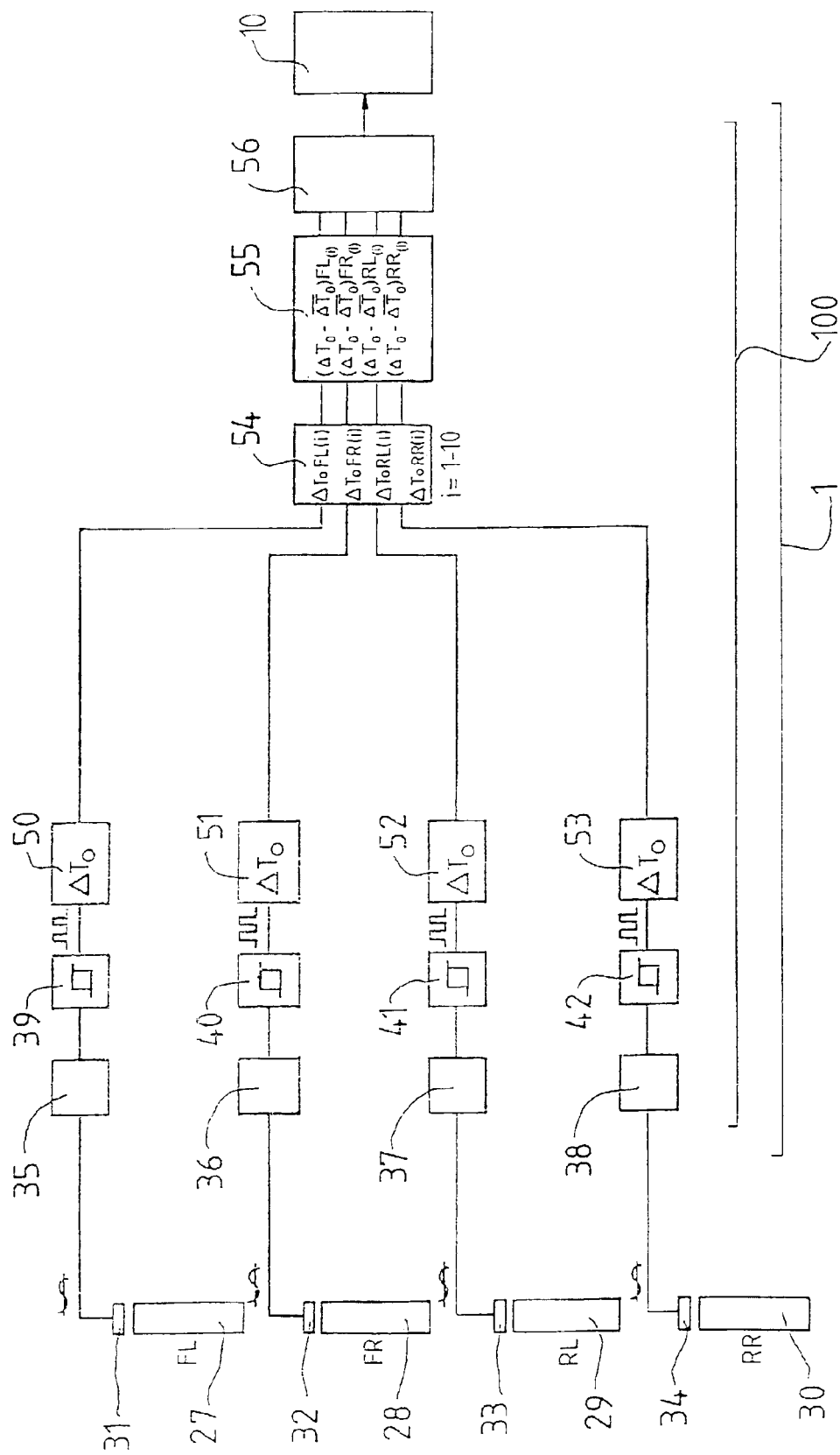
FIG. 9 shows a diagrammatic representation of a signal processing of a device according to the invention as a flow chart, the signal processing being based on the evaluation according to the process of the zero passage times $\Delta T_{0(1)}$ (t)

FIG. 9 shows a diagrammatic representation of a signal processing system based on the evaluation of the zero passage times $\Delta T_{0(i)}$ (t) according to the invention. In this system, the times for partial rotations of the wheel are measured directly by way of the time differences between the zero passages (zero passage times), i.e., the time intervals $\Delta T_{0(i)}$ (t) between the sides of a rectangular vibration, whereby $\Delta T_0$ represents the zero passage time for the findings/measurements i, i+1, i+2, etc.

The sensor devices in this embodiment, arranged on the individual wheels front left, (FL), front right (FR), rear left (RL), and rear right (RR), and which are shown here in diagrammatic form, include the active transmitting devices 27–30 embodied as magnet wheels according to FIG. 2, and the respectively assigned magnetic field sensors 31–34.

As in the signal processing represented in FIG. 8, here, too, the rotational speed output signals detected by the sensor device(s) are transmitted to the signal processing device 100 belonging to the CPU 1, and filtered here with the aid of the low-pass filters 35–38 of high-frequency noise components. Then, the vibration representing the rotational speed output signal is converted into a rectangular signal of individual pulses by Schmitt triggers 39–42.

The individual pulses respectively received from the rotational speed output signals of the individual wheels are then sent to the timers 50 through 53, which measure the corresponding times for several consecutive and defined wheel rotational angles for the partial rotations of the wheel determined by the defined wheel rotational angle. The measurement of the times is made by determining the time differences $\Delta T_{0(i)}$ (t) between two ascending or descending sides of the rectangular signal (zero passage times) correlating to the times for the partial rotations.

The zero passage times $\Delta T_{0FL(i)}$, $\Delta T_{0FR(i)}$, $\Delta T_{0RL(i)}$, and $\Delta T_{0RR(i)}$ of several consecutive time measurements of the respective processed rotational speed output signals of the individual wheels are deposited in or otherwise communicated to a downstream accumulator 54, whereby here, 10 consecutive time measurements (i=10) are stored respectively.

In a computer circuit 55 following the accumulator 54, the deviations of the times for the partial rotations of the wheel from the mean values of the times calculated for one or more wheel revolutions for the partial rotations of the wheel or the zero passage times of several consecutive measurements, are determined and fed to a comparator 56. The comparator 56 compares the determined deviations to reference and/or threshold values and, if a preset difference to the reference and/or threshold values is exceeded, transmits a warning signal to the warning device 10, which in turn is arranged on the dashboard in the driver's field of vision.

Figure 10:
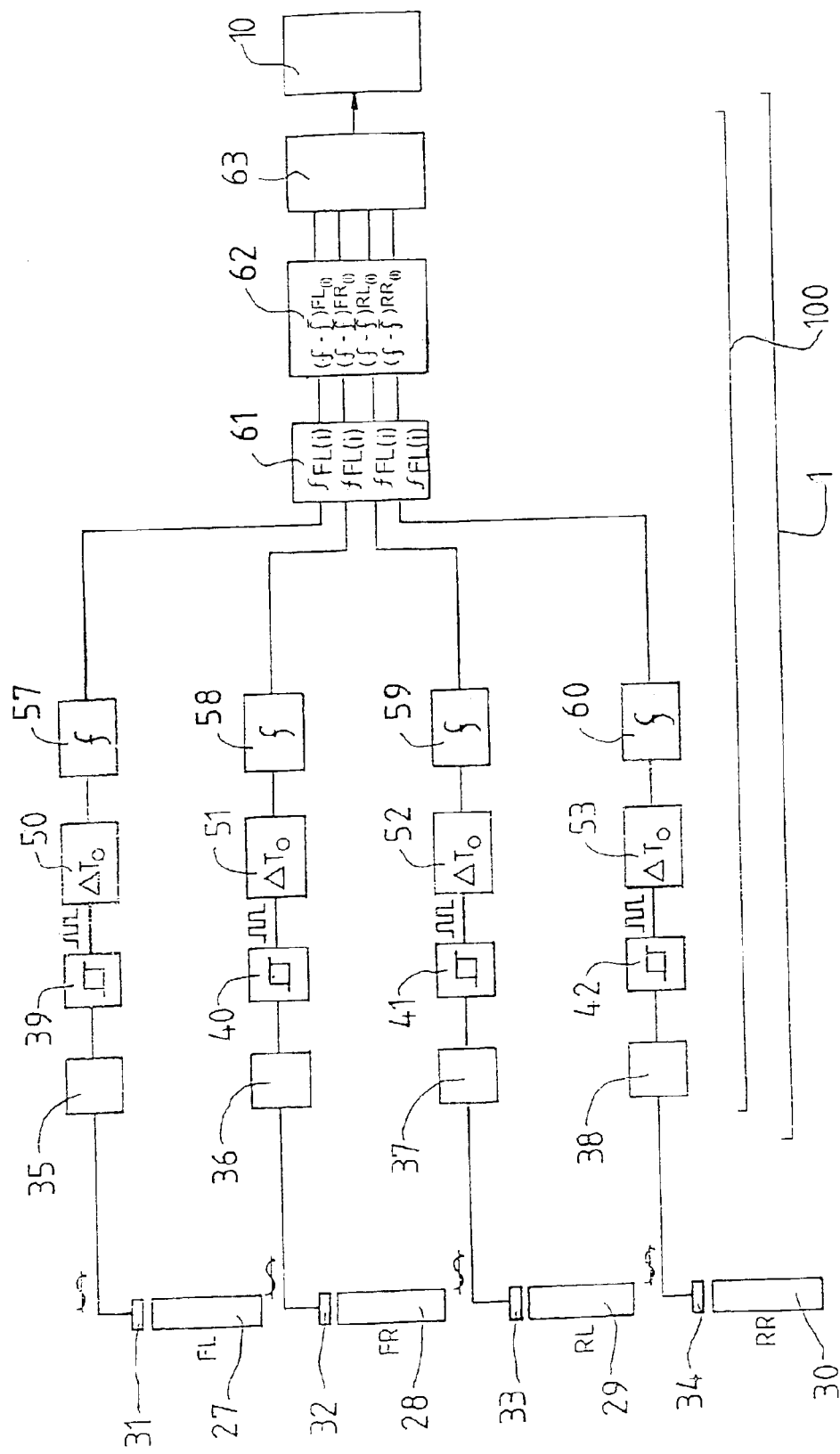
FIG. 10 shows a diagrammatic representation of the signal processing of a device according to the invention as a flow chart, in which a calculation of the frequencies of several consecutive measurements of the zero passage times is made based on the generation of reciprocal values.

FIG. 10 shows a diagrammatic representation of the signal processing of another device or system according to the invention, in which a calculation of the frequencies of several consecutive measurements of the zero passage times based on the generation of reciprocal values is made.

The diagrammatic representation here first shows the sensor devices arranged on the individual wheels front left (FL), front right (FR), rear left (RL) and rear right (RR). These sensor devices are made up of the transmitting devices 27–30 embodied as magnet wheels according to FIG. 2, and the respectively assigned magnetic field sensors 31–34.

The rotational speed output signals detected by the sensor devices are then sent to the signal processing device 100 belonging to the CPU 1. The output signals are filtered of high-frequency noise components with the aid of low-pass filters 35–38, after which the vibration representing the rotational speed output signal is converted into a rectangular signal of individual pulses by Schmitt triggers 39–42.

The respectively received individual pulses from the rotational speed output signals of the individual wheels are then sent to the timers 50 through 53. These measure the corresponding times for several consecutive and defined wheel rotational angles for the partial rotations of the wheel determined through the defined wheel rotational angle. The measurement of the times is made by determining the time differences $\Delta T_{0(i)}$ (t) between two ascending or descending sides of the rectangular signal (zero passage times) correlating to the times for the partial rotations.

The zero passage times obtained in this way are then fed into the ALUs 57–60 in which a calculation of the frequencies of the zero passage times is made by generating reciprocal values according to the formula $f_{(i)}$ (t)=0.5/$\Delta T_{0(i)}$ (t), whereby $f_{(i)}$ (t) represents the determined frequency and $\Delta T_{0(i)}$ (t) represents the zero passage time respectively for the findings/measurements i, i+1, i+2, etc. The factor 0.5 results in this case from the respective 2 measured zero passage times in a vibration period of the here sinusoidal rotational speed output signal of a wheel.

The frequencies determined from the zero passage times $f_{FL(i)}$, $f_{FR(i)}$, $f_{RL(i)}$ and $f_{RR(i)}$ of several consecutive corresponding processings of the respective rotational speed output signals of the individual wheels are stored in a downstream accumulator 61, whereby, e.g., 10 consecutive frequency determinations (i=10) are stored respectively.

In a following computer circuit 62, the deviations of the frequencies from the mean values of the frequencies calculated here for one or more wheel revolutions are calculated for several consecutive frequency determinations and fed to a comparator 63, The comparator 63 compares the determined deviations to reference and/or threshold values and emits a warning signal to the warning device 10 arranged in the driver's field of vision if a preset difference to the reference and/or threshold values is exceeded.

Figure 11:
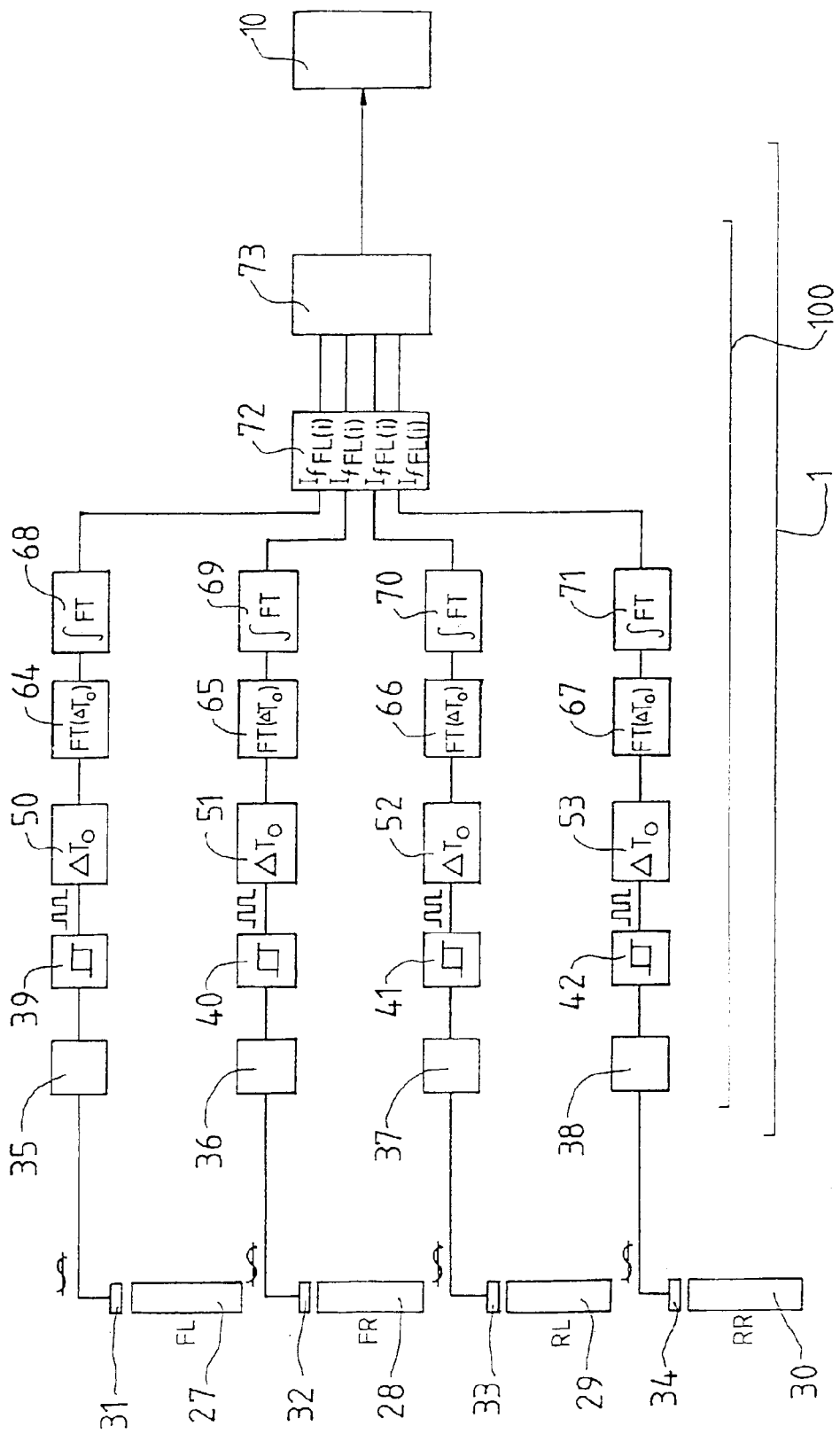
FIG. 11 shows a diagrammatic representation of the signal processing of a device according to the invention as a flow chart, in which with the aid of an ALU the frequency spectrum of the zero passage times depending on the time (times signal) is subjected to a frequency analysis to determine the power spectral density.

FIG. 11 shows a diagrammatic representation of the signal processing system of another device or system according to the invention. With the aid of an ALU, the frequency spectrum of the zero passage times depending on the time (zero passage times signal) is subjected to a frequency analysis to determine the power spectral density.

The sensor devices arranged on the individual wheels front left (FL), front right (FR), rear left (RL) and rear right (RR) are again diagrammatically represented, which sensor devices include the transmitting devices 27–30 embodied as magnet wheels in accordance with FIG. 2, and the respectively assigned magnetic field sensors 31–34.

The rotational speed output signals detected by the sensor devices are then sent to the signal processing device 100 belonging to the CPU 1. The output signals are filtered of high-frequency noise components with the aid of the low-pass filters 35–38, after which, the vibration representing the rotational speed output signal is converted into a rectangular signal of individual pulses by Schmitt triggers 39–42.

The individual pulses respectively received from the rotational speed output signals of the individual wheels are then sent to the timers 50 through 53. These measure the corresponding times for the partial rotations of the wheel determined by the defined wheel rotational angle for several consecutive and defined wheel rotational angles. The measurement of the times is made by determining the time differences $\Delta T_{0(i)}$ (t) between two ascending or descending sides of the rectangular signal (zero passage times) correlating to the times for the partial rotations.

The frequency spectrum of the zero passage times signal thus obtained is then fed to the ALUs 64–67, in which a frequency analysis FT ($\Delta T_0$) in the form of a Fourier transformation, is conducted to determine the spectral power density.

Subsequently the spectral power densities of the correspondingly processed respective rotational speed output signals of the individual wheels are subjected to an integration through certain frequency ranges in the ALUs 68–71, so that a value of the expression $$\int FT(\Delta T_0) df \cong I_{f(i)}$$

results for the integral. The integral values $I_{fFL(i)}$, $I_{fFR(i)}$, $I_{fRL(i)}$ and $I_{fRR(i)}$ thus determined in view of the respective rotational speed output signals of the individual wheels are then sent first to an accumulator 72, and then to a comparator 73, which compares the determined integral values to reference and/or threshold values and sends a warning signal to the warning device 10 arranged in the driver's field of vision, if a preset difference to the reference and/or threshold values is exceeded.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

List of Reference Numbers
1 CPU
2–5 sensor device
6–9 wheel
10 display device
11 magnet wheel
12 magnetic field sensor
13 cogged wheel/transmitting device
14 magnetic field sensor
15 wheel side wall
16 permanent-magnetic areas
17 magnetic field sensor
24 time interval
27–30 active transmitting device
31–34 magnetic field sensor
35–38 low-pass filter
39–42 Schmitt trigger
43–46 timer
43'–46' counter
47 accumulator
48 computer circuit
49 comparator
50–53 timer
54 accumulator
55 computer circuit
56 comparator
57–60 ALU for determining frequencies by generating reciprocal values
61 accumulator
62 computer circuit
63 comparator
64–67 ALU for conducting a Fourier transformation
68–71 ALU for conducting an integration
72 accumulator
73 comparator
100 signal processing device
200 speed curve
201, 202 reference or threshold value
203 time response of the normal rotational speed output signal
204 time response of the superimposed rotational speed output signal
205 zero passage times signal of the normal rotational speed output signal
206 zero passage times signal of the superimposed rotational speed output signal
207 frequencies of the zero passage times of the normal rotational speed output signal
208 frequencies of the zero passage times of the superimposed rotational speed output signal
209 wheel speeds determined from the normal rotational speed output signal
209'–209''' wheel speeds determined from the normal rotational speed output signal during real driving operation
210 wheel speeds determined from the superimposed rotational speed output signal
210' wheel speeds determined from the superimposed rotational speed output signal during real driving operation
211 wheel accelerations determined from the wheel speeds of the normal rotational speed output signal
212 wheel accelerations determined from the wheel speeds of the superimposed rotational speed output signal
213 wheel accelerations filtered by mean value generation
214 spectral power density (normal rotational speed output signal)
215 spectral power density (superimposed rotational speed output signal)

What is claimed:

1. A method of detecting an onset of tread rubber separation of a pneumatic tire on a vehicle, the method comprising:
   producing a permanent first periodic vibration, in at least one of each axle and each wheel, proportional to a wheel rotational speed as a speed output signal;
   feeding the speed output signal to a signal processing device;

wherein in the onset of tread rubber separation, the method further comprises:

superimposing, on a first vibration or the speed output signal, at least one separately defined periodic vibration characteristic of the onset of tread rubber separation and proportional to the wheel rotational speed;

detecting the superimposition of the first periodic vibration with the at least one separately defined periodic vibration characteristic of the onset of tread rubber separation in the signal processing device; and producing a warning signal.

2. The method of claim 1, wherein the speed output signal is produced using one of an active and a passive magnetic field sensor.

3. The method of claim 2, wherein the magnetic field sensor comprises an encoder.

4. The method of claim 2, wherein the magnetic field sensor comprises a rotating member and a stationary member, the magnetic field sensor being situated on a part of the vehicle.

5. The method of claim 4, wherein the magnetic field sensor is positioned on a part of the vehicle which is either stationary or rotates with the wheel, the magnetic field sensor producing a periodic magnetic field change in proportion to the wheel rotation speed.

6. The method of claim 1, wherein the at least one separately defined periodic oscillation is produced by the onset of tread rubber separation on the at least one wheel, the at least one separately defined periodic oscillation being produced when the wheel experiences the onset of tread rubber separation.

7. The method of claim 1, further comprising comparing the speed output signal, after being processed in the signal processing device, with at least one reference and threshold value.

8. The method of claim 7, further comprising recognizing when the at least one reference or threshold value is exceeded and producing the warning signal when the reference or threshold value is exceeded.

9. The method of claim 7, further comprising recognizing the superimposition with the at least one separately defined periodic oscillation when the at least one reference or threshold value is exceeded.

10. The method of claim 9, further comprising recognizing when the at least one reference or threshold value is exceeded and producing the warning signal when the reference or threshold value is exceeded.

11. The method of claim 7, wherein the comparing comprises comparing the speed output signal with a speed output signal of at least one other wheel or axle, the at least one other wheel or axle representing the at least one reference or threshold value.

12. The method of claim 7, wherein, in the signal processing device, the method further comprises:

calculating a wheel speed for a preset time interval from the speed output signal;

comparing the wheel speed with one of at least one reference or threshold value, wherein the speed output signal is represented on the basis of a vibration, and the method further comprises:

determining and storing for several consecutive and defined wheel rotation angles, corresponding times for partial rotations of the wheel determined by the defined wheel rotation angles;

within defined count times $T_L$ containing several consecutive wheel rotation angles, calculating and storing a mean wheel rotation speed for at least one wheel rotation within counting intervals from times determined for the partial rotations and their number;

comparing the mean rotation speed or a variation with the at least one reference or threshold value, wherein, when the at least one reference or threshold value is exceeded, a warning signal is emitted.

13. The method of claim 7, wherein, in the signal processing device, the method further comprises:

determining and storing for several consecutive and defined wheel rotation angles, corresponding times for partial rotations of the wheel determined by the defined wheel rotation angles;

calculating and storing a mean value for several such corresponding times for at least one wheel rotation;

determining deviations of the corresponding times from the calculated and stored mean value; and comparing the deviations with the at least one reference or threshold value, wherein, when the at least one reference or threshold value is exceeded, a warning signal is emitted.

14. The method of claim 7, wherein, in the signal processing device, the method further comprises:

determining and storing for several consecutive and defined wheel rotation angles, corresponding times for partial rotations of the wheel determined by the defined wheel rotation angles;

calculating and storing, with at least one ALU, frequencies of the corresponding times;

calculating and storing for at least one wheel rotation, a mean value of the frequencies;

determining deviations of the frequencies from the mean value; and comparing the deviations with the at least one reference or threshold value, wherein, when the at least one reference or threshold value is exceeded, a warning signal is emitted.

15. The method of claim 7, wherein, in the signal processing device, the method further comprises:

determining and storing for several consecutive and defined wheel rotation angles, corresponding times for partial rotations of the wheel determined by the defined wheel rotation angles;

subjecting to a frequency analysis, with at least one ALU, a frequency spectrum of the corresponding times in order to detect at least one power spectral density;

subjecting to an integration, with at least one ALU, the at least one power spectral density over certain selected frequency intervals;

storing the integration; and comparing an integral value of the selected frequency intervals to the at least one reference or threshold value, wherein, when the at least one reference or threshold value is exceeded, a warning signal is emitted.

16. The method of claim 15, wherein the selected frequency intervals are those which correspond to at least one multiple of a wheel rotational frequency.

17. The method of claim 16, wherein the at least one multiple comprises lower multiples of the wheel rotational frequency.

18. The method of claim 7, wherein, in the signal processing device, the method further comprises:

determining and storing for several consecutive and defined wheel rotation angles, corresponding times for partial rotations of the wheel determined by the defined wheel rotation angles;

calculating and storing, with at least one ALU, at least one instant wheel speed from the corresponding times;

calculating and storing for at least one wheel rotation, a mean value of the at least one instant wheel speed;

determining deviations from the mean value; and comparing the deviations with the at least one reference or threshold value, wherein, when the at least one reference or threshold value is exceeded, a warning signal is emitted.

19. The method of claim 7, wherein, in the signal processing device, the method further comprises:

determining and storing for several consecutive and defined wheel rotation angles, corresponding times for partial rotations of the wheel determined by the defined wheel rotation angles;

calculating and storing, with at least one ALU, at least one instant wheel acceleration from the corresponding times;

calculating and storing for at least one wheel rotation, a mean value of the at least one instant wheel acceleration;

determining deviations from at least one of the mean value or a zero value; and comparing the deviations with the at least one reference or threshold value, wherein, when the at least one reference or threshold value is exceeded, a warning signal is emitted.

20. A system for ascertaining an onset of tread rubber separation of a pneumatic tire on a vehicle, the system comprising:

at least one sensor device arranged at least on each axle, the at least one sensor device adapted to supply a permanently present first periodic oscillation proportional to a wheel rotation speed as a speed output signal;

the at least one sensor device comprising one of an active and a passive magnetic field sensor being mounted to one of rotate with the tire and be stationary;

the at least one sensor device further comprising one of a magnetically active and passive transmitter device which rotates at the wheel rotation speed relative to a magnetic field sensor, the transmitter device being arranged complementary to the at least one passive and active magnetic field sensor and adapted to produce a periodic magnetic field change in proportion to the wheel rotation speed;

at least one signal processing device for processing and evaluating the speed output signal, the signal processing device being adapted to produce one of an output control and a warning signal;

a display device for displaying at least one of the output control and the warning signal; and the system detecting at least one separately defined periodic oscillation related to the onset of tread rubber separation in proportion to the permanently present first periodic oscillation, wherein, in the onset of tread rubber separation, the at least one separately defined periodic oscillation is superimposed on at least one of the permanently present first periodic oscillation and the speed output signal.

21. The system of claim 20, wherein the at least one signal processing device comprises at least one filtering device for filtering noise.

22. The system of claim 20, wherein the at least one signal processing device comprises at least one storage device for storing one of reference and threshold values.

23. The system of claim 20, wherein the at least one signal processing device comprises a comparator which, after processing, compares a respective speed output signal with one of at least one reference value and at least one threshold value, and detects a superimposition of the first periodic oscillation with the at least one separately defined periodic oscillation, such that when the reference value or the threshold value is exceeded, a warning signal is produced.

24. The system of claim 20, wherein the speed output signal is an input signal for the at least one signal processing device and the at least one signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measures corresponding times for partial rotations of the wheel determined by the defined wheel rotation angles, with the times being measured by ascertaining time differences between two decreasing or increasing edges of the square wave signal that correlate with the times for the partial rotations;

at least one counting device connected in parallel to one of the at least one time control device and the at least one timer and receiving the single-pulse signal, the at least one counting device ascertaining one of the number of single pulses obtained and measured times within a defined count time $T_L$;

at least one of an accumulator and a storage device for storing the measured corresponding times for partial rotations of the wheel and the number of single pulses obtained within several successive count times $T_L$;

a computer circuit for calculating and storing an average wheel rotation velocity within the count times $T_L$ for at least one wheel rotation from the times ascertained for the partial rotations and their numbers within the count times $T_L$; and a comparator for comparing one of the average wheel rotation velocity or their course with one of at least one reference value and at least one threshold value, wherein, when the at least one reference value or the at least one threshold value is exceeded by the averaged wheel rotation velocity or their course, a warning signal is activated.

25. The system of claim 20, wherein the speed output signal is an input signal for the at least one signal processing device and the at least one signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measures corresponding times for partial rotations of the wheel determined by the defined wheel rotation angles, with the times being measured by ascertaining time differences between two decreasing or increasing edges of the square wave signal that correlate with the times for the partial rotations;

at least one of an accumulator and a storage device for storing the measured corresponding times for partial rotations of the wheel;

a computer circuit for calculating an average value from the measures corresponding times for partial rotations of the wheel and for calculating deviations of the measures corresponding times for partial rotations of the wheel from the average value; and a comparator for comparing the deviations with one of at least one reference value and at least one threshold value, wherein, when the at least one reference value or the at least one threshold value is exceeded by the deviations, a warning signal is activated.

26. The system of claim 20, wherein the speed output signal is an input signal for the at least one signal processing device and the at least one signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations;

at least one ALU communicating with one of the at least one time control device and the at least one timer;

at least one of an accumulator and a storage device communicating with the at least one ALU;

a computer circuit for calculating an average value of several successively calculated frequencies and for calculating deviations of the calculated frequencies from the average value; and a comparator for comparing the deviations with one of at least one reference value and at least one threshold value, wherein when the at least one reference value or the at least one threshold value is exceeded by the deviations, a warning signal is activated.

27. The system of claim 20, wherein the speed output signal is an input signal for the at least one signal processing device and the at least one signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations;

at least one first ALU communicating with the at least one time control device and the at least one timer;

at least one second ALU communicating with the at least one first ALU;

at least one of an accumulator and a storage device for storing several successively ascertained integrals; and a comparator for comparing the ascertained integrals with one of at least one reference value and at least one threshold value, wherein, when the at least one reference value or the at least one threshold value is exceeded by the ascertained integrals, a warning signal is activated.

28. The system of claim 20, wherein the speed output signal is fed from some portion of an anti-locking braking system.

29. The system of claim 20, wherein an anti-locking braking system is coupled to the signal processing device.

30. A method for ascertaining an onset of tread rubber separation condition of a pneumatic tire on a motor vehicle, the method comprising:

sensing a permanently present first periodic oscillation proportional to a wheel rotation speed of at least one wheel of the motor vehicle, the at least one wheel being adapted to produce at least one periodic oscillation characteristic of the onset of tread rubber separation condition when the wheel experiences any tread rubber separation, the sensing being performed by at least one sensor device disposed adjacent the at least one wheel;

feeding a speed output signal from the at least one sensor device to at least one filter which filters out high-frequency noise portions of the speed output signal;

converting the speed output signal into a square wave signal of single pulses using one of at least comparator circuit and at least one Schmitt trigger;

processing the single pulses using at least one processing device and producing at least one output;

storing the at least one output in a storage device;

subjecting the at least one output to a calculation with a computer circuit to produce at least one value;

comparing the at least one value with one of at least one reference value and at least one threshold value using a comparator; and producing at least one warning signal on a display device when the at least one value exceeds the at least one reference value or the at least one threshold value, wherein the at least one warning signal is produced when the tire experiences the onset of tread rubber separation.

31. The method of claim 30, wherein the processing is performed by two processing devices, one processing device comprising a time control device and the other processing device comprising a counting device.

32. The method of claim 30, wherein the processing is performed by the at least one processing device which comprises a time control device.

33. The method of claim 30, wherein the processing is performed by two processing devices, one processing device comprising a time control device and the other processing device comprising a computer.

34. A method for ascertaining an onset of tread rubber separation of a pneumatic tire on a motor vehicle, the method comprising:

sensing a permanently present first periodic oscillation proportional to a wheel rotation speed of at least one wheel of the motor vehicle, the at least one wheel being capable of producing at least one periodic oscillation characteristic of the onset of tread rubber separation when the wheel experiences any tread rubber separation, the sensing being performed by at least one sensor device disposed adjacent the at least one wheel;

feeding a speed output signal from the at least one sensor device to at least one filter which filters out high-frequency noise portions of the speed output signal;

converting the speed output signal into a square wave signal of single pulses using one of at least one comparator circuit and at least one Schmitt trigger;

processing the single pulses using one of at least one time control device and at least one timer and producing a frequency spectrum;

feeding the frequency spectrum to a computer and performing a frequency analysis using a Fourier transform to ascertain power spectral densities;

integrating the power spectral densities using a computer and an integral so as to produce ascertained integrals;

feeding the ascertained integrals to at least one a storage device;

comparing the ascertained integrals with one of at least one reference value and at least one threshold value using a comparator; and producing at least one warning signal on a display device when the ascertained integrals exceed the at least one reference value or the at least one threshold value, wherein the at least one warning signal is produced when the tire experiences the tread rubber separation.

35. A system for ascertaining an onset of tread rubber separation of a pneumatic tire on a motor vehicle, the system comprising:

a plurality of wheel sensor devices disposed on the vehicle, each wheel sensor device comprising:

one of an active or passive magnetic field sensor being disposed adjacent each wheel of the vehicle, each wheel sensor device supplying a permanently present first periodic oscillation in proportion to a wheel rotation speed in the form of a speed output signal;

a signal processing device receiving the speed output signal, the signal processing device comprising:

a plurality of low-pass filters for filtering out high-frequency noise portions of the speed output signal;

a Schmitt trigger connected to each low-pass filter;

a time control device connected to each Schmitt trigger, an accumulator connected to the time control devices;

a computer circuit connected to the accumulator;

a comparator connected to the computer circuit; and a display connected to the comparator, wherein the signal processing device processes and evaluates the speed output signal, the singal processing device being adapted to produce a warning signal on the display device when the wheel experiences any tread rubber separation.

36. The system of claim 35, wherein the signal processing device further comprises a counting device connected to each Schmitt trigger and connected to the accumulator.

37. A system for ascertaining an onset of tread rubber separation of a pneumatic tire on a motor vehicle, the system comprising:

a plurality of wheel sensor devices disposed on the vehicle, each wheel sensor device comprising:

one of an active or passive magnetic field sensor being disposed adjacent each wheel of the vehicle, each wheel sensor device supplying a permanently present first periodic oscillation in proportion to a wheel rotation speed in the form of a speed output signal;

a signal processing device receiving the speed output signal, the signal processing device comprising:

a plurality of low-pass filters for filtering out high-frequency noise portions of the speed output signal;

a Schmitt trigger connected to each low-pass filter, a time control device connected to each Schmitt trigger;

an ALU connected to each time control device;

an accumulator connected to each ALU;

a computer circuit connected to the accumulator;

a comparator connected to the computer circuit; and a display connected to the comparator, wherein the signal processing device processes and evaluates the speed output signal, the signal processing device being adapted to produce a warning signal on the display device when the wheel experiences any tread rubber separation.

38. A system for ascertaining an onset of tread rubber separation of a pneumatic tire on a motor vehicle, the system comprising:

a plurality of wheel sensor devices disposed on the vehicle, each wheel sensor device comprising:

one of an active or passive magnetic field sensor being disposed adjacent each wheel of the vehicle, each wheel sensor device supplying a permanently present first periodic oscillation in proportion to a wheel rotation speed in the form of a speed output signal;

a signal processing device receiving the speed output signal, the signal processing device comprising:

a plurality of low-pass filters for filtering out high-frequency noise portions of the speed output signal;

a Schmitt trigger connected to each low-pass filter;

a time control device connected to each Schmitt trigger;

a first ALU connected to each time control device;

a second ALU connected to each first ALU;

an accumulator connected to each second ALU;

a comparator connected to the accumulator; and a display connected to the comparator, wherein the signal processing device processes and evaluates the speed output signal, the signal processing device being adapted to produce a warning signal on the display device when the wheel experiences any tread rubber separation.

* * * * *